United States Patent
Tipping et al.

(10) Patent No.: US 6,233,884 B1
(45) Date of Patent: *May 22, 2001

(54) METHOD AND APPARATUS TO CONTROL SEISMIC FORCES, ACCELERATIONS, AND DISPLACEMENTS OF STRUCTURES

(76) Inventors: Steven B. Tipping, 8429 Wildcat Dr., El Cerrito, CA (US) 94530; David Mar, 2510-1/2 Etna St., Berkeley, CA (US) 94704

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,219

(22) Filed: Oct. 20, 1997

(51) Int. Cl.[7] ................................................. E04H 9/02
(52) U.S. Cl. ........................ 52/167.1; 52/167.4; 52/741.3
(58) Field of Search .......................... 52/167.1, 167.3, 52/167.4, 167.5, 167.6, 167.7, 167.8, 167.9, 741.3

(56) References Cited

U.S. PATENT DOCUMENTS

| | | |
|---|---|---|
| 3,418,768 | 12/1968 | Cardan . |
| 3,538,653 | 11/1970 | Meckler . |
| 3,691,712 | 9/1972 | Bowling et al. . |
| 4,402,483 * | 9/1983 | Kurabayashi et al. ........ 52/167.1 X |
| 4,766,706 | 8/1988 | Caspe . |
| 4,910,929 * | 3/1990 | Scholl ............................... 52/167.3 |
| 5,025,600 * | 6/1991 | Sugimoto et al. .................. 52/167.1 |
| 5,065,552 | 11/1991 | Kobori et al. . |
| 5,152,110 | 10/1992 | Garza-Tamez . |
| 5,271,197 | 12/1993 | Uno et al. . |
| 5,347,771 | 9/1994 | Kobori et al. . |
| 5,491,938 | 2/1996 | Niwa et al. . |
| 5,564,536 * | 10/1996 | Lai ................................... 52/167.5 X |
| 5,630,298 * | 5/1997 | Tsai et al. .......................... 52/167.3 |
| 5,816,559 * | 10/1998 | Fujimoto ........................... 52/167.6 X |
| 5,819,484 * | 10/1998 | Kar .................................... 52/167.3 |

FOREIGN PATENT DOCUMENTS

| | | | |
|---|---|---|---|
| 2-80770 * | 3/1990 | (JP) | ...................................... 52/167.3 |
| 3-100233 * | 4/1991 | (JP) | ...................................... 52/167.1 |
| 3-253676 * | 11/1991 | (JP) | ...................................... 52/167.1 |
| 6-58017 * | 3/1994 | (JP) | ...................................... 52/167.1 |
| 6-167140 * | 6/1994 | (JP) | ...................................... 52/167.1 |
| 6-173495 * | 6/1994 | (JP) | ...................................... 52/167.1 |
| 6-173498 * | 6/1994 | (JP) | ...................................... 52/167.1 |
| 6-212833 * | 8/1994 | (JP) | ...................................... 52/167.1 |
| 6-307118 * | 11/1994 | (JP) | ...................................... 52/167.1 |
| 1507943 * | 9/1989 | (SU) | ...................................... 52/167.3 |
| 1656107 * | 6/1991 | (SU) | ...................................... 52/167.1 |

OTHER PUBLICATIONS

Ian Aiken, Ph.D., et al., *"Energy Dissemination Systems Enhance Seismic Performance"*.

Patrick Crosby, *"Seismically Retrofitting A Thirteen–Story Steel–Framed Building with Viscoelastic Dampers"*.

Cynthia L. Perry et al., *"Seismically Upgrading A Wells Fargo Bank"*.

Jefferson W. Asher, et al., *Seismically Damping the San Bernardino County Medical Center*.

* cited by examiner

*Primary Examiner*—Laura A. Callo
(74) *Attorney, Agent, or Firm*—Townsend and Townsend and Crew LLP

(57) ABSTRACT

A seismic energy dissipation system for use with structures such as buildings, bridges and the like. The system includes a gravity frame, at least one reaction frame, and connection apparatus for connecting the gravity frame and the reaction frame. The connection apparatus includes springs for setting a period of response and energy dissipation units for dissipating energy within the structure, thus controlling the response of a structure with respect to internal forces, accelerations and deformations due to external excitations such as wind or earthquake.

29 Claims, 23 Drawing Sheets

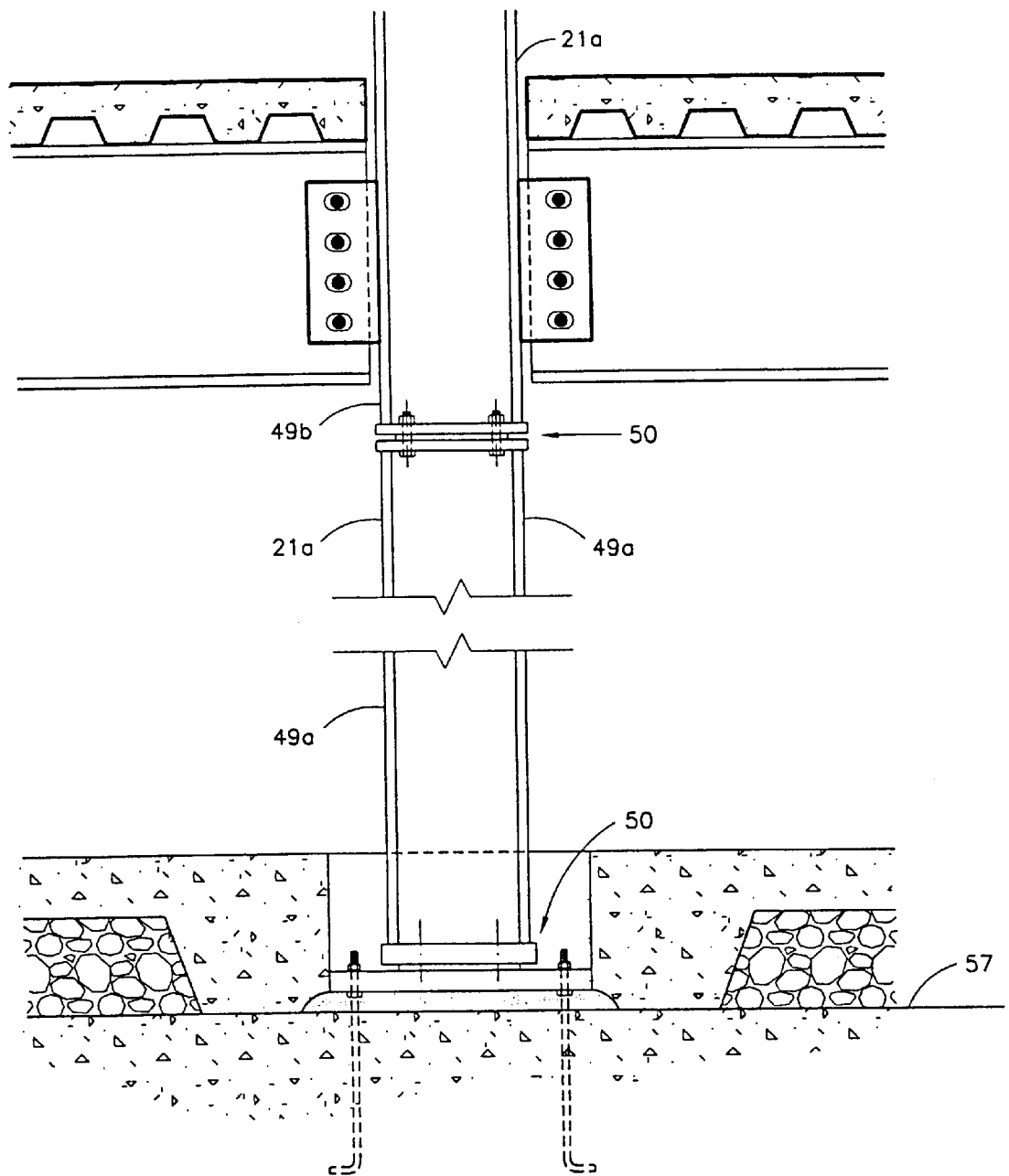

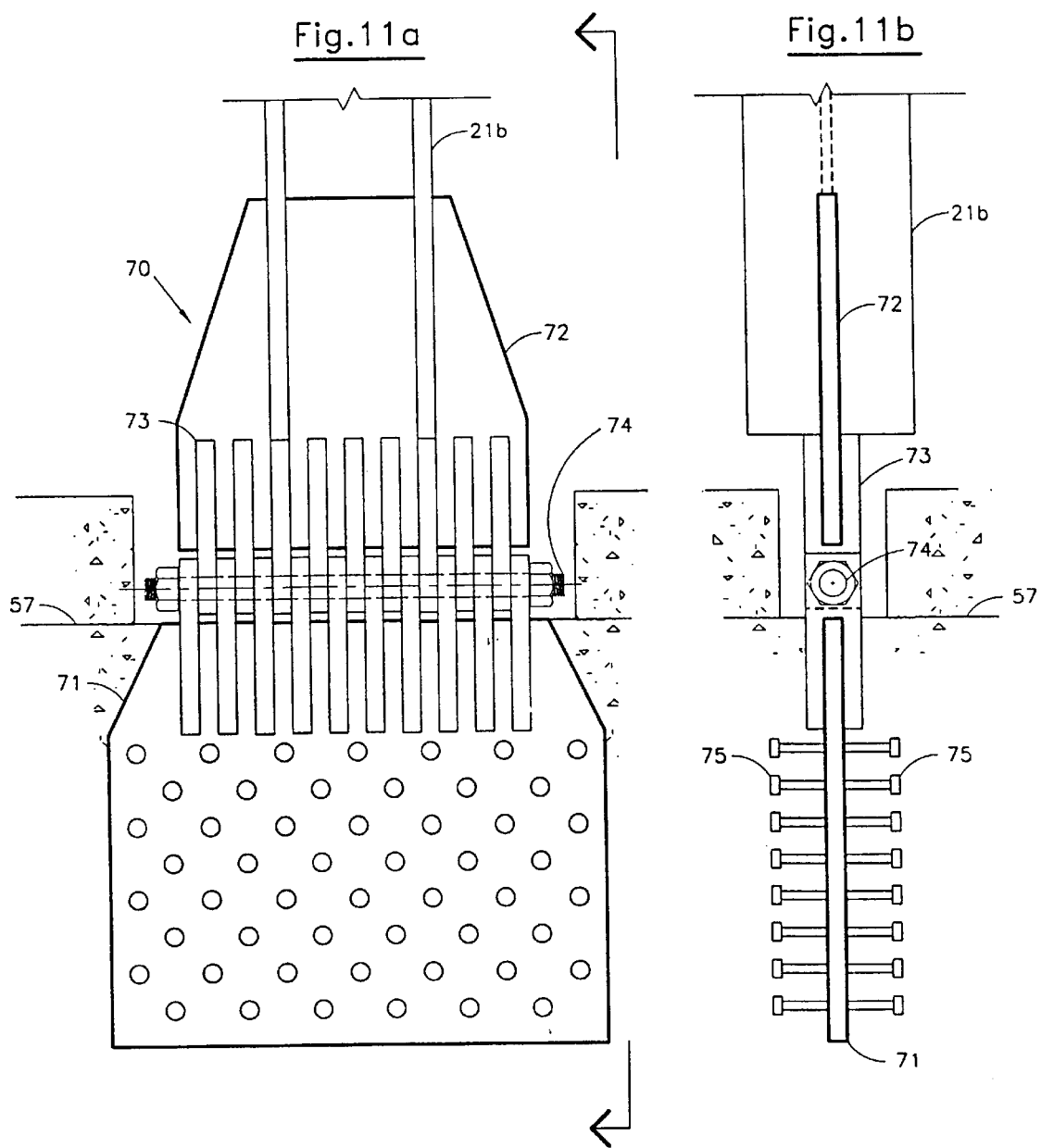

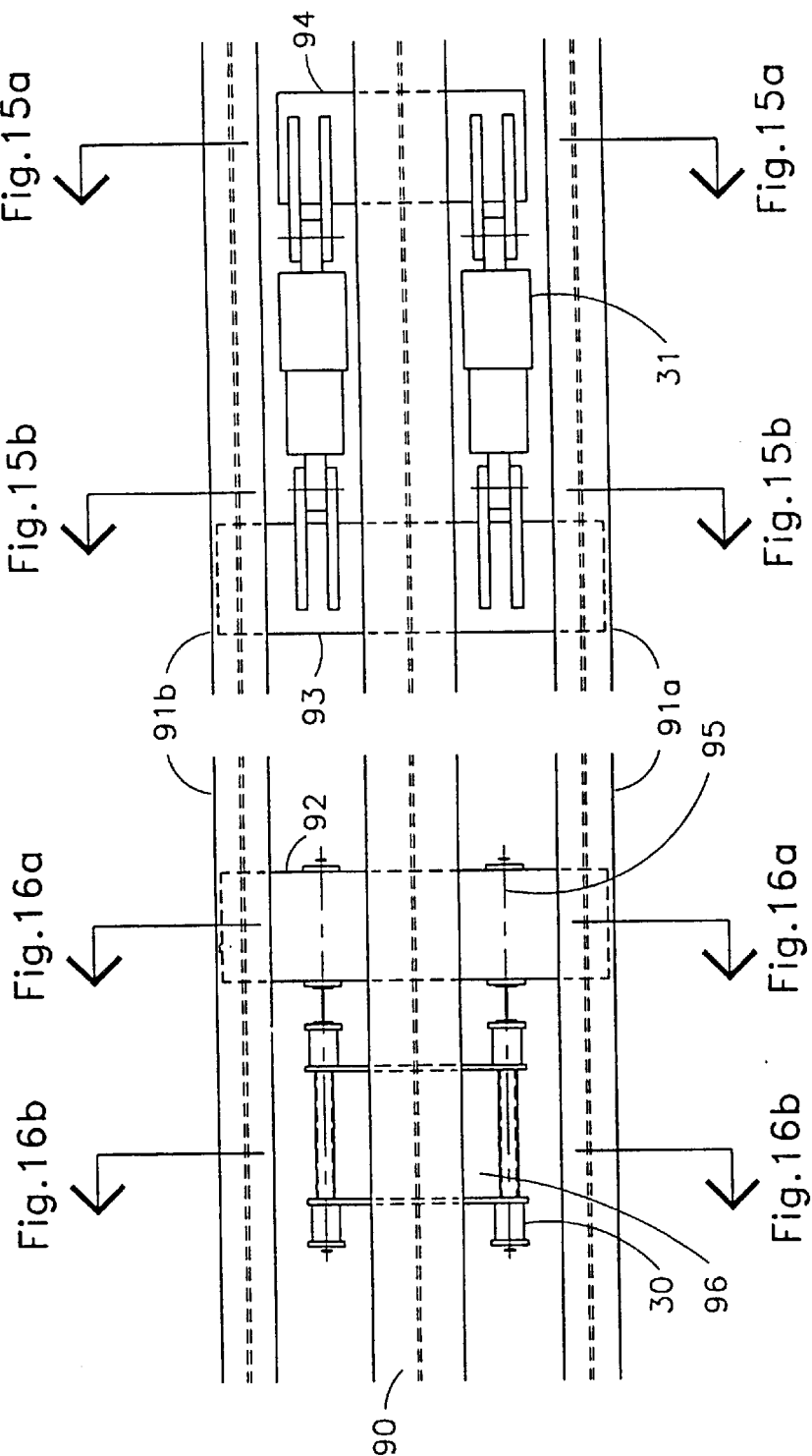

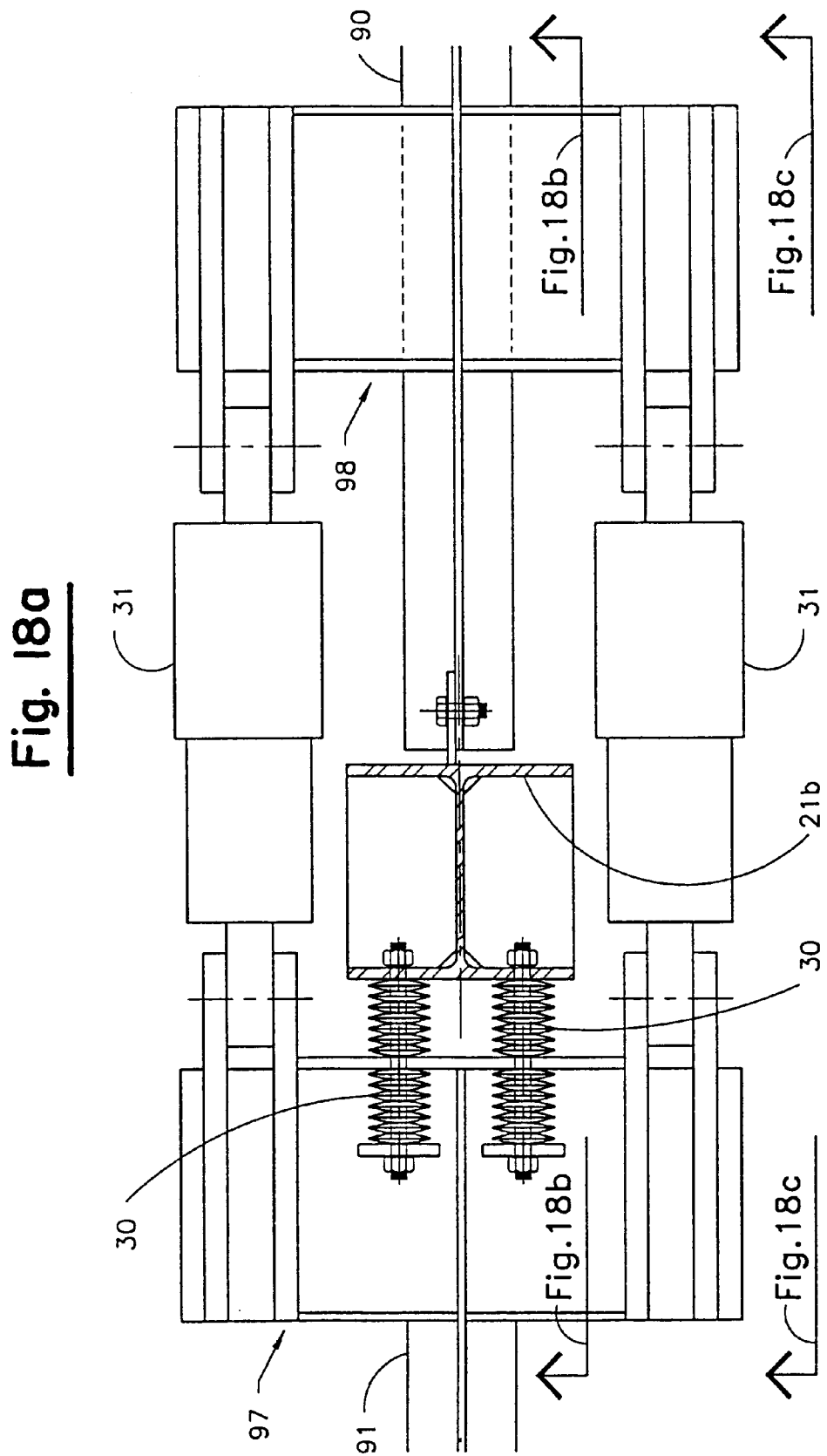

METHOD AND APPARATUS TO CONTROL SEISMIC FORCES, ACCELERATIONS, AND DISPLACEMENTS OF STRUCTURES

BACKGROUND OF THE INVENTION

1. Technical Field

This invention relates to a system for damping and limiting internal forces, accelerations, drifts, etc. caused by external excitations such as earthquakes and wind in structures such as buildings and bridges, and more particularly, to a structural system in which the periods of response, deflection patterns and damping capabilities of the structure are set by the invention in order to dissipate seismic energy and control the internal forces, displacements and accelerations.

2. Description of the Prior Art

In order to protect a structure such as a building or bridge, as well as people who may occupy or be in the vicinity of such structures, seismic force resistive systems have been devised. These systems occasionally include active and/or passive seismic energy dissipation devices. These systems attempt to protect the structure from total collapse and control damage in response to seismic forces created by earthquakes. Typically a local building code sets minimum equivalent seismic forces that must be resisted by the structure based on various parameters. The magnitude and distribution of these forces are generally determined as a function of the structure's mass, its vibrational properties (periods of response), the regional seismicity, the local soil conditions, the type of seismic system, and the importance of the structure.

For conventional structures that include a seismic resistive system, such as a seismic bracing system, predominant periods of response and the damping capabilities are effectively "built-into" the system as determined by its mass and the configuration and material properties of the elements that comprise the seismic bracing system. These elements usually consist of various types of structural walls and/or frames. The period of response of the structure and its damping capabilities affect the internal forces, accelerations, and displacements of the structure in response to a given earthquake.

With conventional bracing systems, the lateral elastic seismic response of a structure is affected by the stiffness of the seismic system relative to the shaking characteristics of the earthquake and the system's damping properties. In general, moderate to large earthquakes, at moderate to large distances from a structure's site, produce larger forces in stiffer structures and smaller forces in softer structures when the soils under the structure are at least moderately stiff. Under the conditions described above, the relative deflections are smaller for stiffer structures and larger for softer structures. These general relationships may not be valid if the structure is located very close to an earthquake fault that ruptures or if the structure is underlain by extremely soft soils.

Generally, a stiffer structure must be made stronger than a softer structure to elastically withstand larger seismic forces. The stiffer structure produces higher internal accelerations that can adversely affect its contents. When a stiff structure is not made strong enough to resist the elastic seismic forces, it sustains structural damage. By sustaining damage, the structure dissipates the seismic energy. Internal forces are limited to the elastic strength of the structure. The structure effectively softens and undergoes larger drifts. These larger drifts are in-elastic deformations that can increase non-structural damage.

On the other hand, a softer structure can generally be made relatively weaker than the stiffer structure and still elastically withstand seismic forces from a given earthquake. As with a stiff structure, when the soft structure is not made strong enough to resist the elastic seismic forces, it also dissipates the seismic energy by sustaining structural damage. The soft structure may undergo large deformations that can adversely affect non structural elements by subjecting them to the structure's deformations.

The ability of a structure to sustain significant structural damage without a significant loss of strength, (i.e., structures with high ductility) is accounted for in the local building code. Structures with high ductility may be designed to be weaker than those with lower ductility.

Supplemental damping may be provided by adding Energy Dissipating Units (EDU) within the bracing elements of a conventional seismic bracing system. The added damping improves the seismic performance of the structure by reducing deflections, accelerations, and structural and non-structural damage.

FIG. 20 graphically illustrates the general relationships between acceleration, period of response and damping for a simplified model that may be used to understand complex structures.

There are several basic relationships of strength, stiffness and ductility of structural systems that affect current design practice. Some of these relationships include:

For a given size and type of structure, an increase in strength usually results in an increase in stiffness;

An increase in stiffness usually results in an increase of seismic forces, internal accelerations (and potential content damage), and a decrease in deformation;

A decrease in strength usually results in an increase in ductility demand or damping demand;

An increase in supplemental damping usually results in a decrease of forces, deformations, internal accelerations, and structural and non-structural damage; and Relative improvements in strength, ductility and damping of a system usually result in added costs.

A typical arrangement of supplemental damping within a moment frame structure is illustrated in FIG. 1. All or part of the system's lateral static stiffness is a result of the flexural stiffness of the beams 13 and columns 14 that are connected with a rigid or semi-rigid joint also known as a moment joint 15. The braces 10 are added to the frame between each level in order to couple the levels with an Energy Dissipation Unit (EDU) 11. The energy dissipation devices may work by using several mechanisms such as friction, yielding metals, energy absorbing plastics, rubbers, etc, and fluids forced through orifices. These devices (EDUs) may be activated by the relative displacement between each level, by the relative velocity between each level, or by active control methods. The EDUs may also provide additional static stiffness to the frame via the braces. In a second common arrangement, illustrated in FIG. 2, a brace 10 extends diagonally between portions of a frame with an EDU 11 in the middle.

Supplemental damping devices may add substantial costs to conventional seismic bracing systems. To date, the costs associated with the installation of these devices has been a factor in their limited use.

Another prior art system, illustrated in FIG. 3 has an isolation layer under the entire building and is commonly referred to as a base isolation system. The isolation layer utilizes isolators 16, generally in the form of bearings, and controls imparted accelerations and deformations in two ways: by affecting the structure's period of response, since the bearings are relatively soft when subjected to lateral ground accelerations; and by providing damping. Optional supplemental damping devices 11 may be added. The damping devices (those integral with the bearings and supplemental) help to control the structure's deformations, accelerations and forces. The structural system above the isolators tends to be similar to that of a conventional seismic bracing system; however, the isolated structure would tend to sustain less damage during a large earthquake.

Since the isolation layer is soft, the structure experiences large horizontal movements or "drifts" (even with the optional damping devices). These drifts, which are generally between one and two feet, must be accommodated by the various building systems such as elevators, piping, power lines, etc. Additionally, the building must be separated from and allowed to deform relative to the surrounding grade by means of a special covered mote or seismic joint. Base isolation buildings tend to perform better than ones with conventional seismic bracing systems during earthquakes. However, there are significant added costs associated with the installation of a base isolation system that are attributed to the isolators, the mote, and the special building system details needed to accommodate the large deformations. These costs, to date, have limited the use of base isolated systems.

Accordingly, a seismic system that controls loads, internal accelerations, deformations, and structural and nonstructural damage while being economical and non-disruptive to the function of the building is needed.

SUMMARY OF THE INVENTION

A tuned, damped structural system in accordance with the present invention, as well as a method of use thereof, addresses the shortcomings of the prior art.

In accordance with one aspect of the present invention, a system for use with a structure such as a building or a bridge for damping internal forces, limiting accelerations and drifts caused by external excitations such as, for example, earthquakes, explosions, wind, etc., includes a gravity frame, at least one reaction frame, and connection apparatus for connecting the gravity frame and the reaction frame. The connection apparatus includes at least one spring for setting a period of response and at least one damping device for dissipating seismic or wind energy within the structure caused by the external excitations.

In accordance with another aspect of the present invention, the system includes at least four reaction frames. Each reaction frame is contained within a different vertical plane of the structure.

In accordance with yet another aspect of the present invention, the structure is a building that extends for one or more stories vertically. The system includes multiple springs and multiple damping devices in the form of energy dissipation units. Each story includes at least one spring and at least one energy dissipation unit for connecting the reaction frame to the gravity frame.

In accordance with yet another aspect of the present invention, the gravity frame comprises multiple beams and columns and first level columns of the gravity frame include rotationally low stiffness connections at the top and bottom to minimize stiffness of the frame and to minimize internal forces in the first level columns.

In accordance with a further aspect of the present invention, the reaction frame is connected to the ground via rotationally flexible connections to minimize internal forces due to out of plane bending.

In accordance with another aspect of the present invention, first level columns of the gravity frame are connected to base isolation rollers that are connected to the ground.

In accordance with a further aspect of the present invention, the base isolation rollers are low friction pads.

In accordance with yet another aspect of the present invention, the system further includes wind fuses between the gravity frame and the reaction frame to rigidly connect the frames during low level winds and earthquakes, the wind fuses disengaging during large external excitations.

In accordance with an alternative embodiment of the present invention, the reaction frame is rigidly linked with the gravity frame.

In accordance with one aspect of the alternative embodiment, the system is configured such that it includes at least one tuned-damped frame that includes a pair of diagonally extending braces located between two columns and two beams and defining an apex, at least one spring connecting the pair to the rigidly linked gravity and reaction frames, and at least one damping device connecting the pair to the rigidly linked gravity and reaction frames.

In accordance with another aspect of the alternative embodiment, the system comprises at least four tuned-damped frames. Each tuned-damped frame is contained within a different vertical plane defined by the structure.

In accordance with yet another aspect of the alternative embodiment, the structure is a multi-storied building and each story has at least four tuned-damped frames. Each tuned-damped frame of each story is contained within a different vertical plane defined by the building.

In accordance with another aspect of the alternative embodiment, the system is comprised of columns with rotationally low stiffness connections at their bases and beams framing into these columns with rotationally low stiffness connections to minimize stiffness to the rigidly linked gravity and reaction frame and minimize internal forces in the system.

In accordance with another aspect of the present invention, a method of damping internal forces, limiting accelerations and drifts within a structure such as a building or a bridge caused by external excitations, the structure including a gravity frame and a reaction frame, includes connecting springs between the reaction frame of the structure and the gravity frame of the structure, and connecting energy dissipation units between the reaction frame of the structure and the gravity frame of the structure.

In accordance with yet another aspect of the present invention, the method further includes selecting a desired period of response of the structure to external excitations, configuring the springs based upon the desired period of response, selecting a desired level of damping in order to limit accelerations and drifts within the structure caused by external excitations, and configuring the energy dissipation units based upon the desired level.

Accordingly, a tuned damped structural system in accordance with the present invention for use in buildings, bridges, and the like, includes energy dissipation devices, springs, a gravity frame, and reaction frames so arranged to independently set the period of response of the structure, the deformation patterns of the structure, the strength of the structure, and the damping capability of the structure.

With the preferred embodiment of the present invention, the coupling of the gravity load carrying frame and the seismic load reaction frames, in the case of buildings, occurs at the level of the floor diaphragm. As with traditional seismic engineering practice, the building's distributed mass may be approximated as lumped masses at each floor diaphragm. The design of the gravity load carrying frame can be detailed such that its lateral stiffness may be analytically neglected. The seismic load reaction frame can be designed with a very high stiffness and a very small mass resulting in very small periods of response. As such, the response of the reaction frame will approximate that of the ground motion. Since the seismic reaction frames are essentially rigid, and the gravity load carrying frame is essentially flexible, the overall lateral stiffness of the building is determined by the plurality of springs. Additionally, the overall damping capabilities of the building are determined by the plurality of the energy dissipation devices. Furthermore, the building can be mathematically modeled as a series of independent single-degree-of-freedom structures, in which the parameters such as mass, stiffness, and damping are assigned for each story. As such, a building's response to a given earthquake can be analytically determined and characterized by periods of response, accelerations, forces, and deformations.

Other features and advantages of the present invention will be understood upon reading and understanding the detailed description of the preferred exemplary embodiments, found hereinbelow, in conjunction with reference to the drawings, in which like numerals represent like elements.

BRIEF DESCRIPTION OF THE DRAWINGS

FIG. 7 is an elevation view of a first level column of the gravity frame having pinned connections;

FIG. 8b is a plan view of the connection illustrated in FIG. 8a;

FIG. 11a is an enlarged front elevation view of a possible connection of a column of the reaction frame illustrating a hinged connection that would minimize internal stresses due to out of plane bending;

FIG. 11b is an enlarged side elevation view of the connection illustrated in FIG. 11a;

FIG. 12b is an enlarged section view of the meeting point illustrated in FIG. 12a;

FIG. 14 is a plan view of one possible arrangement of springs and dampers interconnecting the gravity frame and a reaction frame of a tuned damped structural system in accordance with the present invention as indicated by the line FIG. 14—FIG. 14 in FIG. 10;

FIG. 18a is a plan view illustrating another arrangement of springs and dampers as indicated by the line FIG. 18a—FIG. 18a in FIG. 10;

FIGS. 18b and 18c are partial elevation views illustrating the arrangement of springs and dampers illustrated in FIG. 18a;

DETAILED DESCRIPTION OF THE PREFERRED EXEMPLARY EMBODIMENTS

The present invention may be utilized with structures such as, for example, buildings, bridges, elevated roadways, and elevated railways. For simplicity and clarity, it will be described with reference to utilizing it with a building.

Figure 1:
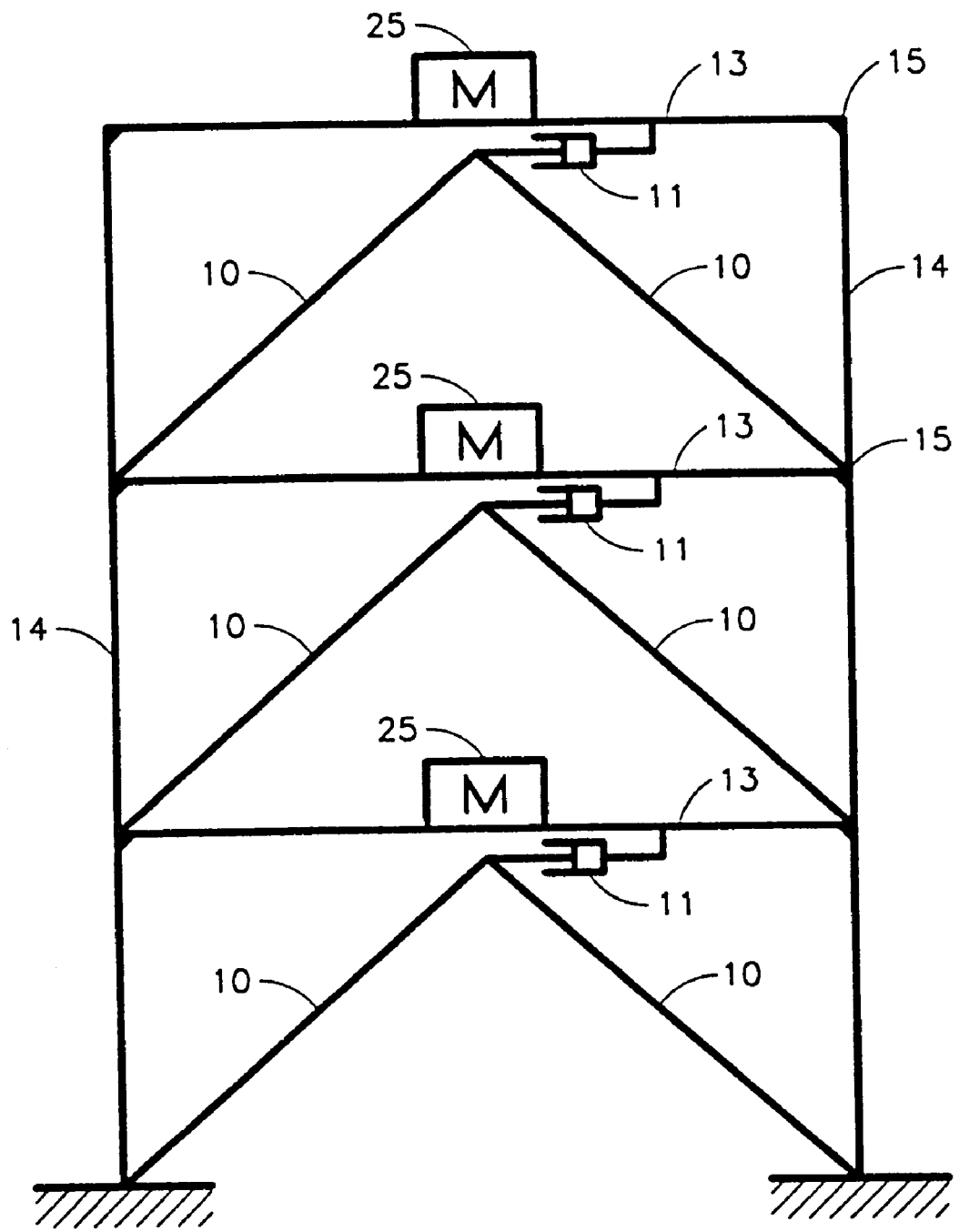
FIG. 1 is a schematic view of one prior art seismic energy dissipation system.
Figure 2:
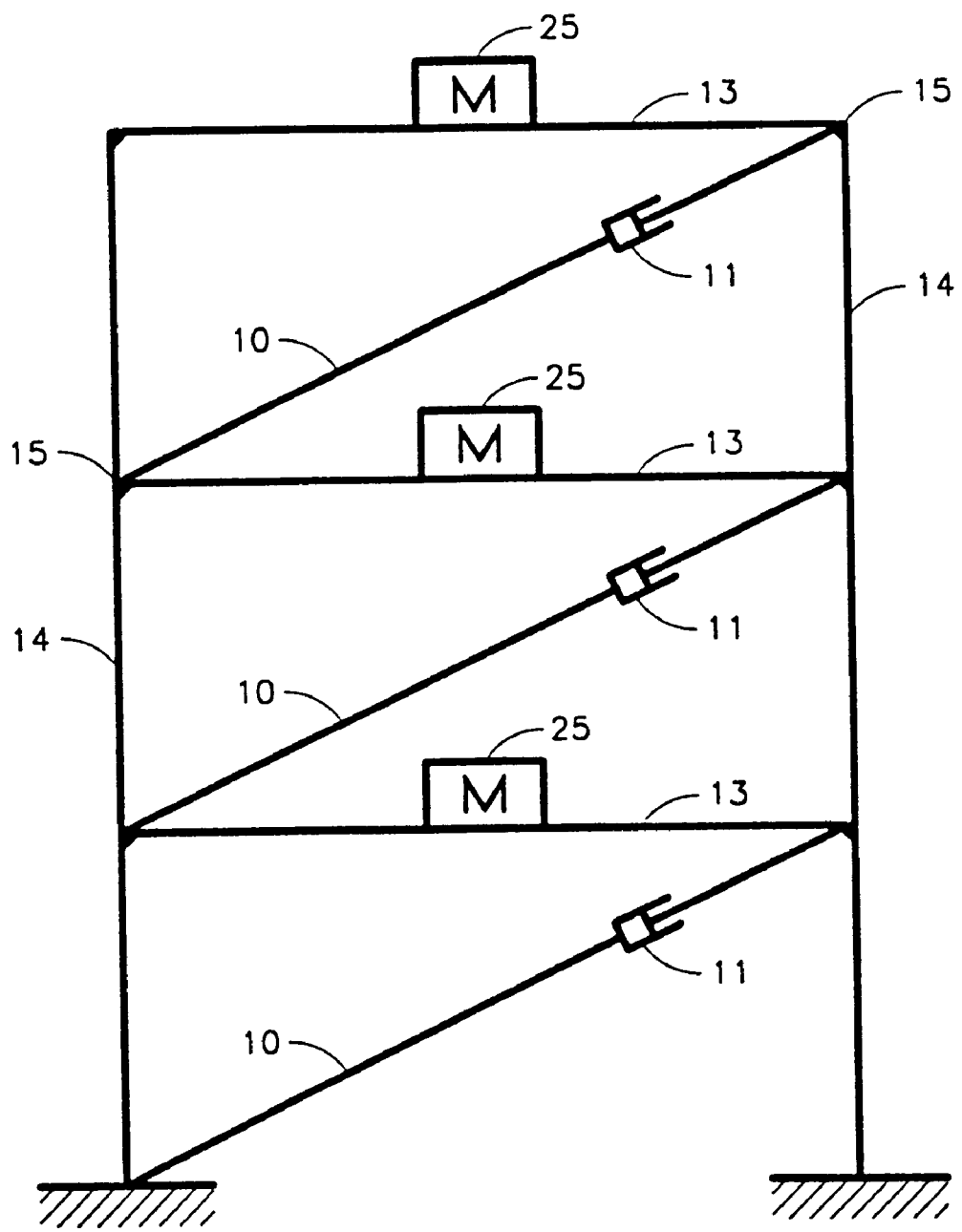
FIG. 2 is a schematic illustration of a second prior art seismic energy dissipation system.
Figure 3:
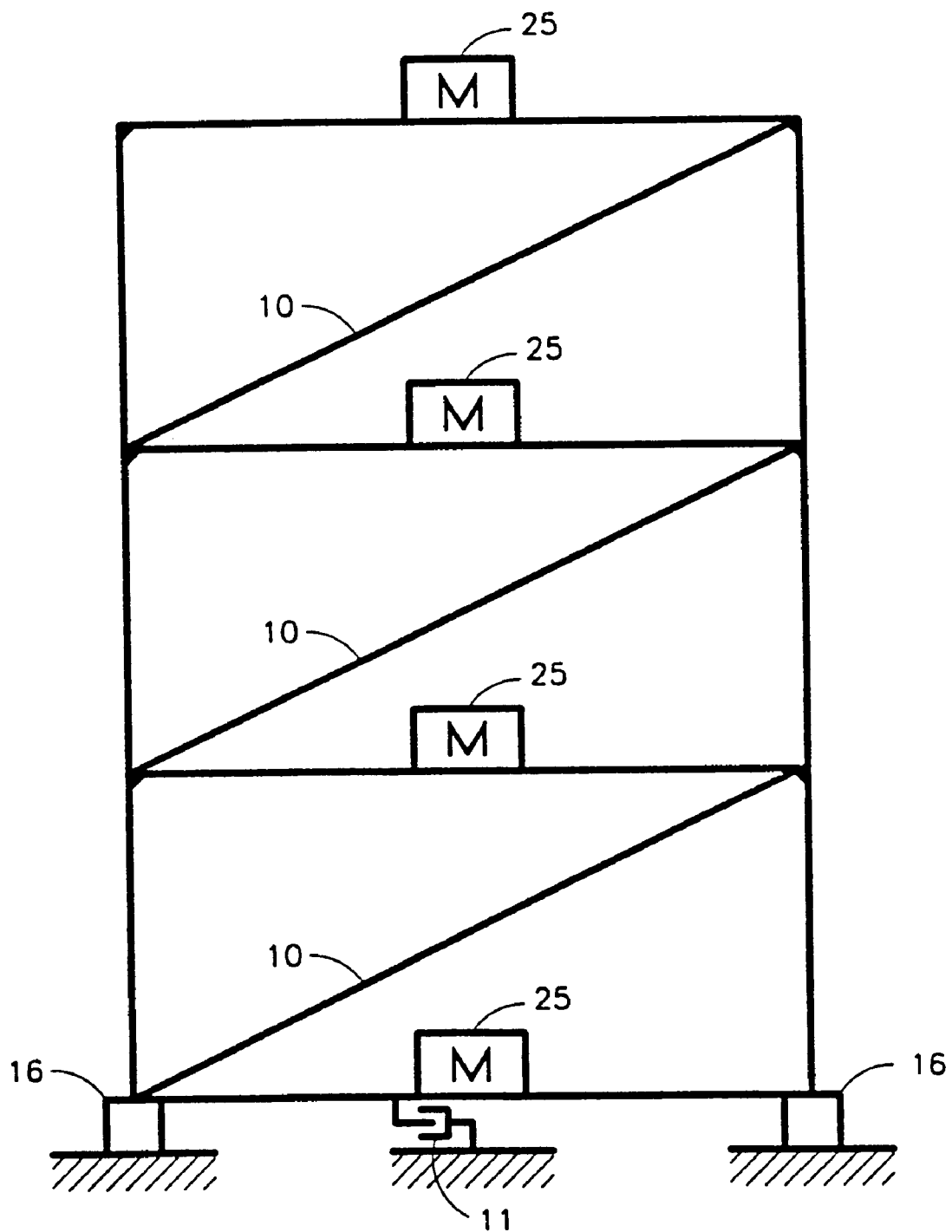
FIG. 3 is a schematic illustration of a third prior art seismic energy dissipation system.
Figure 4:
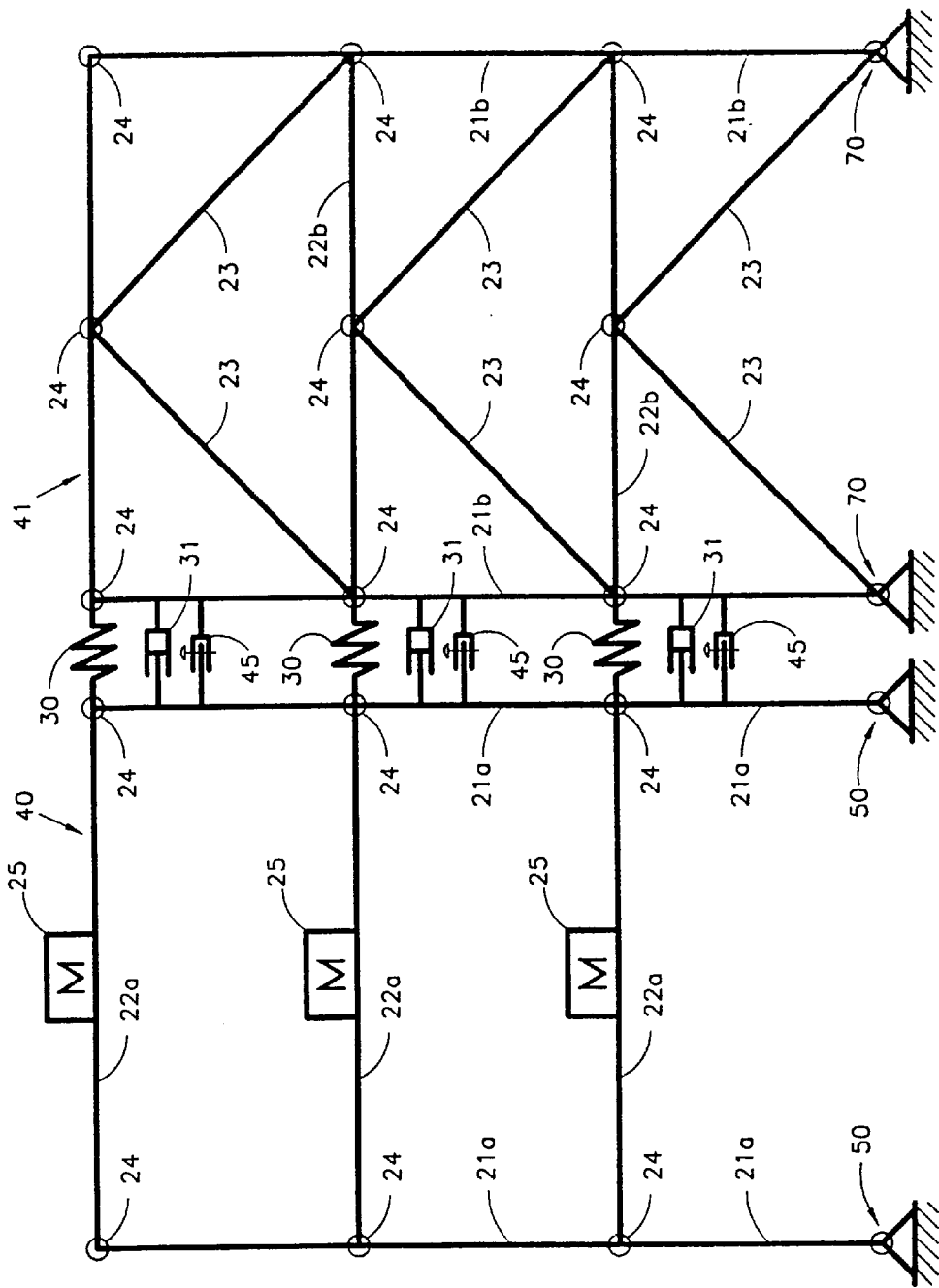
FIG. 4 is a schematic illustration of a tuned damped structural system in accordance with the present invention.
Figure 10:
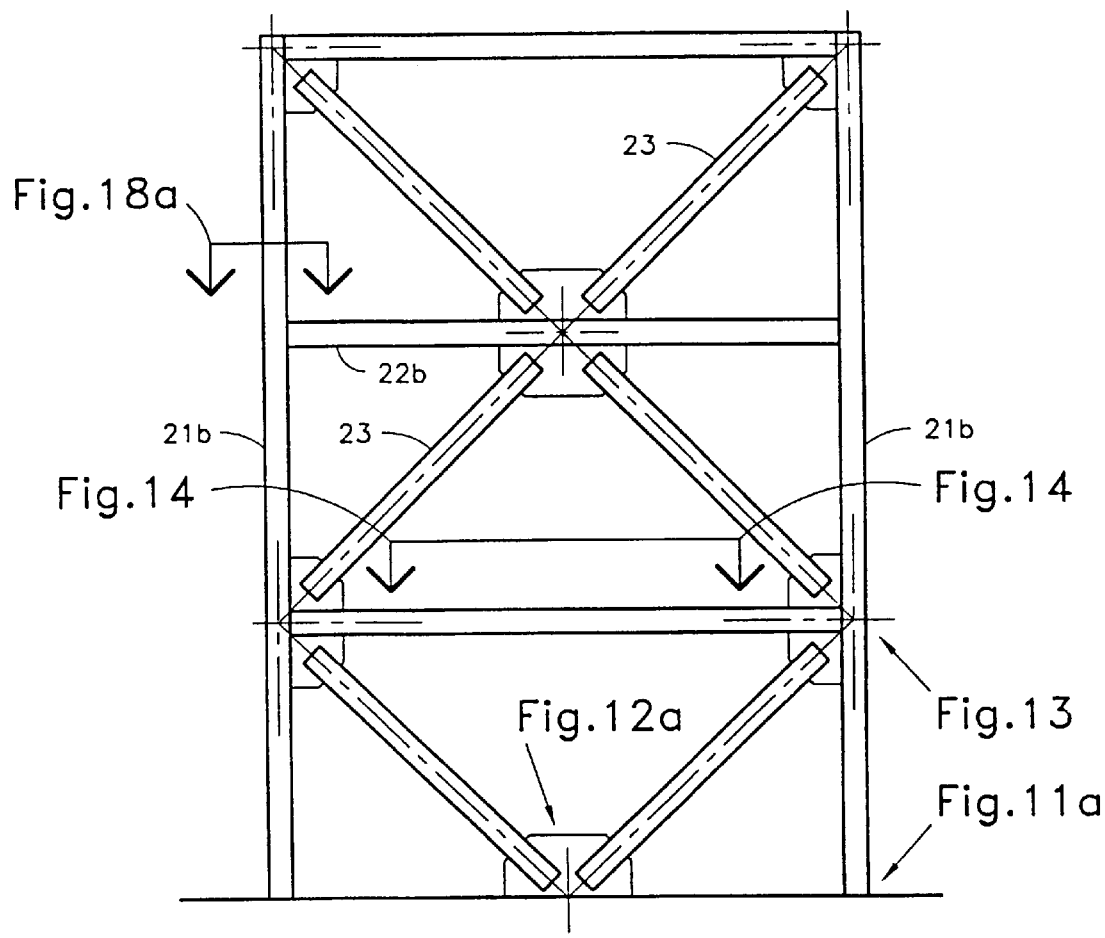
FIG. 10 is an elevation view illustrating a possible arrangement of a reaction frame of steel construction.

Turning to FIG. 4, a system for damping or limiting internal forces caused by external forces, such as earthquakes, in accordance with the present invention is schematically illustrated. With this arrangement, a tuned, damped structure 20 comprises a gravity frame 40 and at least one reaction frame 41. In this embodiment, gravity frame 40 comprises columns 21a and beams 22a, while reaction frame 41 comprises columns 21b and beams 22b. As can be seen in FIG. 10, the reaction frame also includes braces 23 arranged in a substantially inverted V shape, which could be in a V-shape, X-shape, etc., with one pair of braces present at each floor. The braces, columns, and beams are joined at various locations with joints 24. Additionally, in this embodiment, the gravity and reaction frames are connected to the ground via joints 50 and 70 at a base of the structure utilizing the system.

Reaction frame 41 may consist of various materials and configurations such as, for example, walls of reinforced concrete, reinforced masonry, wood, steel, etc.; rock or soil buttresses; braced frames of steel, or reinforced concrete, moment frames of steel, reinforced concrete, etc.; or the like. Reaction frame 41 needs to be fairly rigidly connected to the ground.

In the preferred embodiment, the gravity frame and reaction frame are connected via a plurality of springs 30 and dampers or energy dissipation unit (EDU) 31. The springs are configured in order to set the period of response for the building through the spring stiffness. The period of response is set by adjusting the stiffness of springs 30. A stiffer spring creates a more rigid structure with a lower period of response while a "softer" spring creates a softer structure with a higher period of response. In conjunction with the stiffness of the springs, which have set the period of response, the energy dissipating units will be sized and configured in order to set a level of damping for dissipating energy caused by external excitations.

In a preferred embodiment, a minimum of one spring and one damper or EDU connect each reaction frame to the gravity frame. However, springs and dampers are generally additive and therefore multiple small springs may be utilized to create the overall spring effect of one large spring. Similarly, multiple small dampers may be utilized to create the overall effect one large damper. Finally, it is also true that springs have their own inherent damping effect and EDUs have their own inherent spring effect. These damping and spring effects are additive to the overall damping and stiffness.

Figure 5:
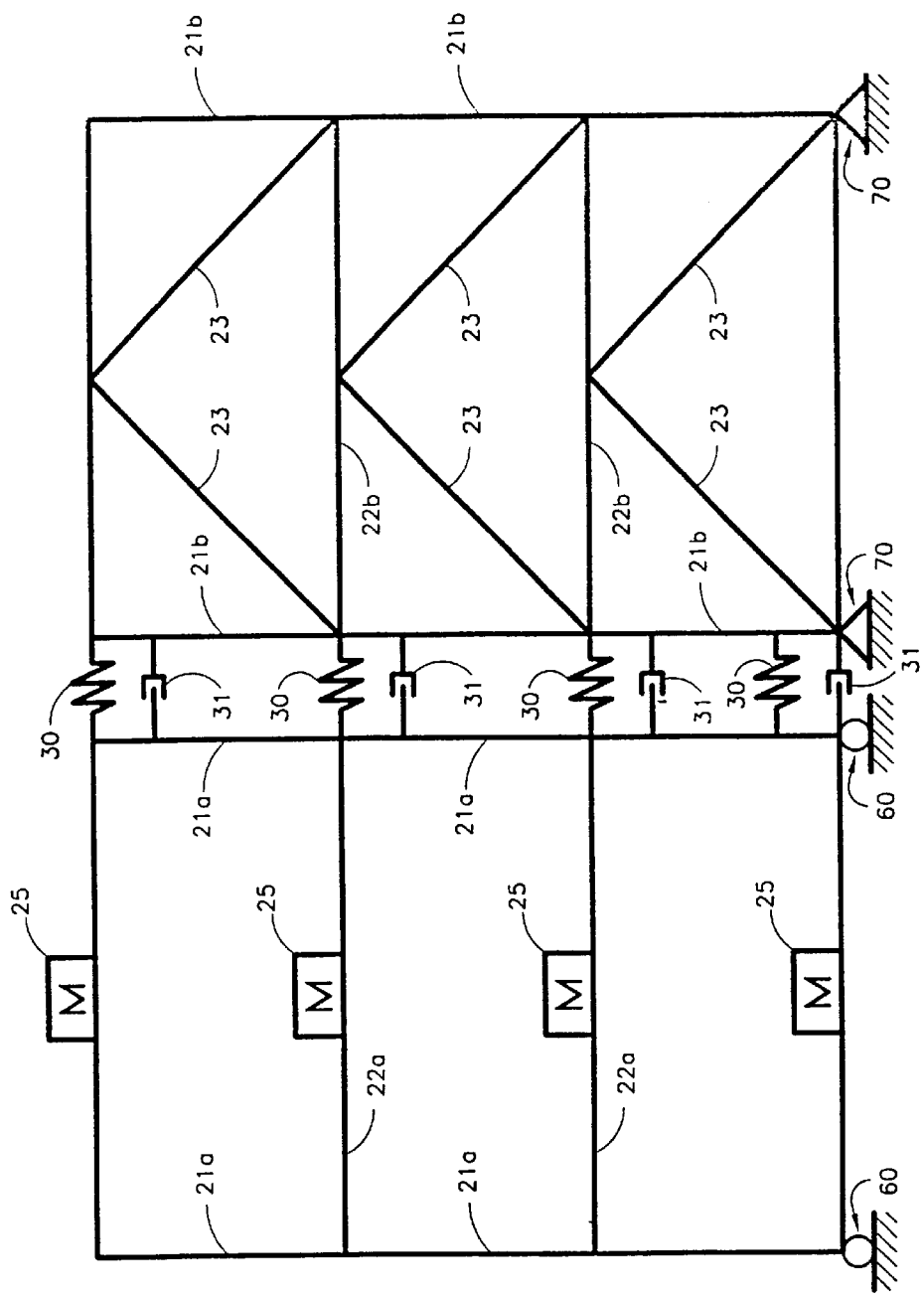
FIG. 5 is a schematic illustration of the tuned damped structural system illustrated in FIG. 4 wherein the gravity frame is connected to the ground via low friction pads.
Figure 6:
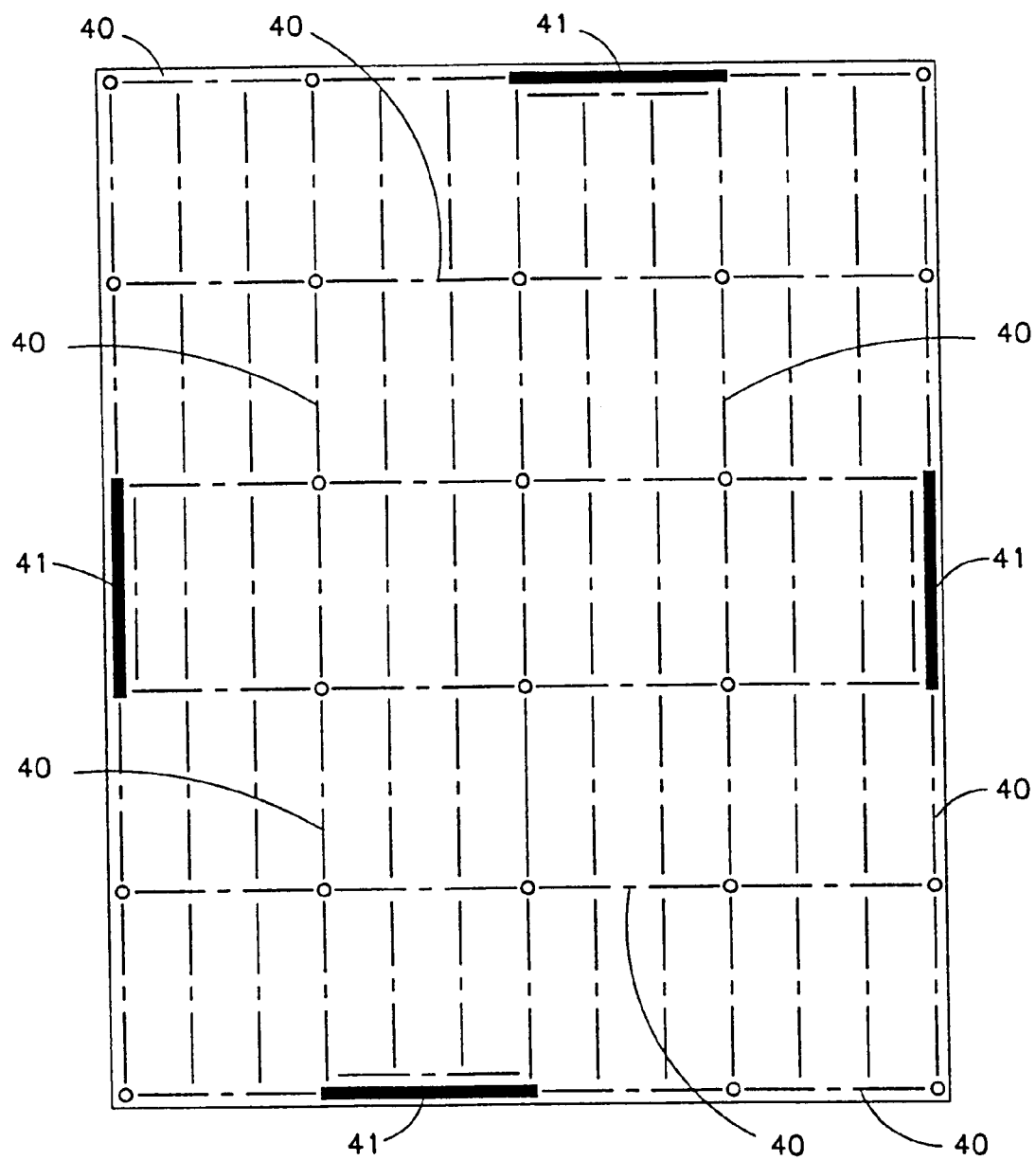
FIG. 6 is a plan schematic view of a floor framing plan for a steel frame building illustrating an arrangement of gravity frames and reaction frames of a tuned damped structural system in accordance with the present invention.

The mass (weight) associated with the overall structure 20 and carried by each floor is represented by blocks 25 in FIGS. 4 and 5. In order to account for the total load within the building, enough reaction frames are utilized when creating the overall structure 20. FIG. 6 illustrates one possible floor framing plan for a steel frame building utilizing the system in accordance with the present invention. Four reaction frames 41 are interspersed within the gravity frame 40 to create the tuned, damped structure 20. In order to meet most local building codes, four reaction frames 41 are typically required, with each reaction frame 41 being in a different vertical plane. The reaction frames are not required to be across from one another. More or fewer reaction frames 41 may be utilized depending on the shape or size of the building.

With the tuned, damped structure 20, forces within the dampers and springs are not additive from floor to floor and the forces are approximately the same at each floor when the stories have similar masses, springs and energy dissipation units. The mass is coupled to the spring's stiffness but decoupled from the reaction frame 41 stiffness and the masses at each story may be effectively decoupled from each other. The gravity effect on the mass is effectively carried by the gravity frame 40. The reaction frame 41 is effectively rigidly connected to the base of the building 57. Accordingly, the individual stories of the building do not interfere with each other and the passive seismic energy dissipation system within the tuned, damped structure isolates floor by floor and therefore each floor basically acts as a one-story structure. This is far less disruptive to the function of the building as opposed to other seismic energy dissipation systems that isolate the entire structure together from seismic forces. Additionally, as compared to prior art seismic energy dissipation systems, such as the base isolation system, the passive seismic energy dissipation system in accordance with the present invention is estimated to cost significantly less.

Figure 8B:
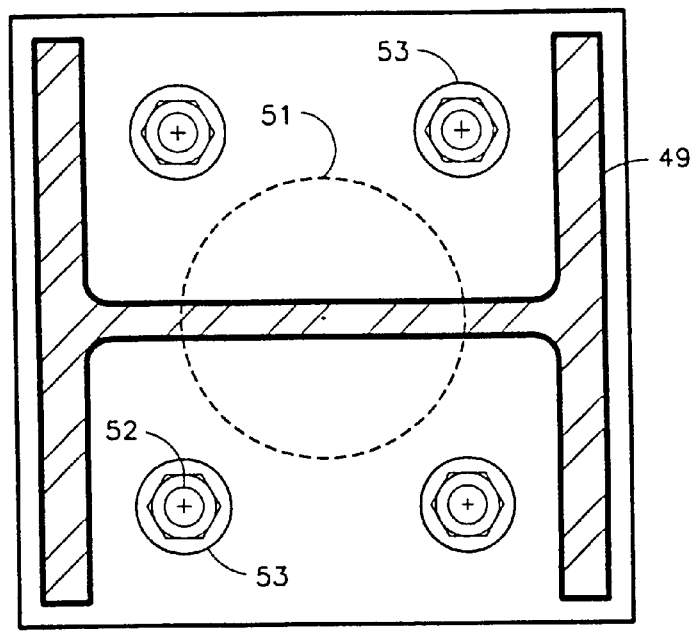
Figure 8A:
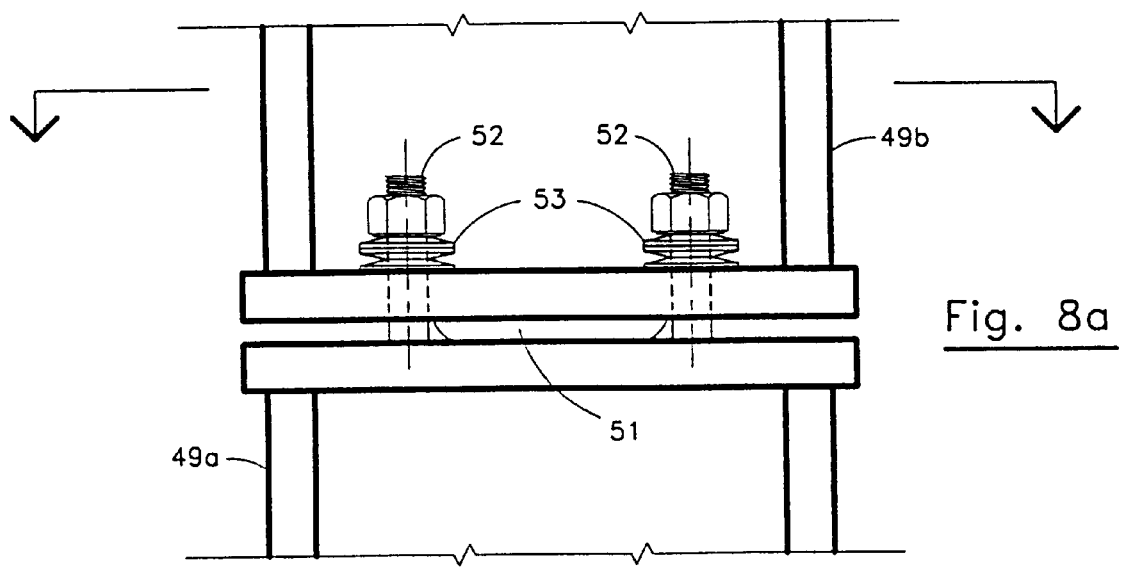
FIG. 8a is an enlarged view of a connection within a first level column of the gravity frame of a tuned damped structural system in accordance with the present invention.

FIGS. 7, 8a and 8b illustrate how columns 21a within the gravity frame are preferably connected at a first level. The first level may be at ground level or below ground depending on the building, i.e. whether or not the building extends below ground. A lower column 49a is joined with an upper column 49b by low rotational stiffness joints, commonly referred to as pin joints 50. A pin joint 50 is also utilized to connect lower column 49a to the base 57 of the building or the ground. These pin joints allow the gravity frame 40 to be "soft" to thereby contribute only marginal stiffness to the system.

As can be seen in FIGS. 8a and 8b, pin joints 50 comprise a circular bearing 51 that is placed between two adjacent columns 49a and 49b. Four bolts 52 are utilized to connect the adjacent column sections with Belleville spring washers 53.

Figure 9:
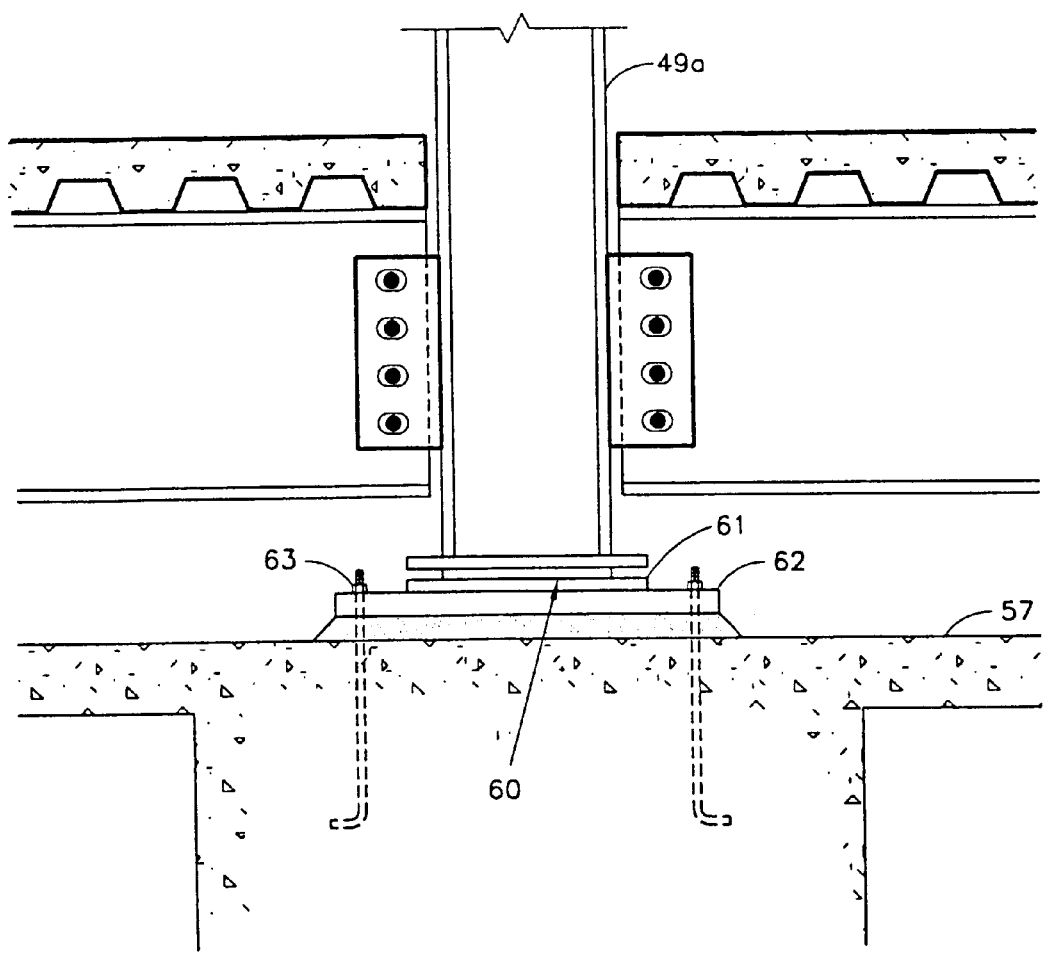
FIG. 9 is an enlarged view of a first level column of the gravity frame illustrated in FIG. 5.

FIGS. 5 and 9 illustrate an embodiment in which the gravity frame 40 is supported by rollers 60 at the first level. The rollers 60 make the gravity frame 40 even softer and replace the first level of pin joints 50 to thereby connection column sections 49a to base 57. As can be seen in FIG. 9, rollers 60 are preferably in the form of low friction pads. An example of such a pad comprises PTFE fabric, available from Merriman, Inc. located at 100 Industrial Park Road, Hingham, Mass. 02043, and having a coefficient of friction of approximately 0.04. The rollers 60 are placed on plates 61 that are on bases 62. The bases 62 are bolted to the base 57 of the building with bolts 63.

FIGS. 11a and 11b illustrate one possible way a column 21b in the reaction frame 41 may be connected to the base 57 of the building or the ground. A flexible joint 70 that is rotationally flexible is utilized that includes a base 71 and a body 72. The base 71 and the body 72 each include multiple fingers 73 that project therefrom and intermingle. A bolt 74 connects base 71 and body 72. Base 71 is embedded within base 57 of the building securely with headed studs 75. Because reaction frame 41 is extremely rigid, the flexible joint 70 allows the columns to move in response to out of plane forces without experiencing large internal stresses.

Figure 11D:
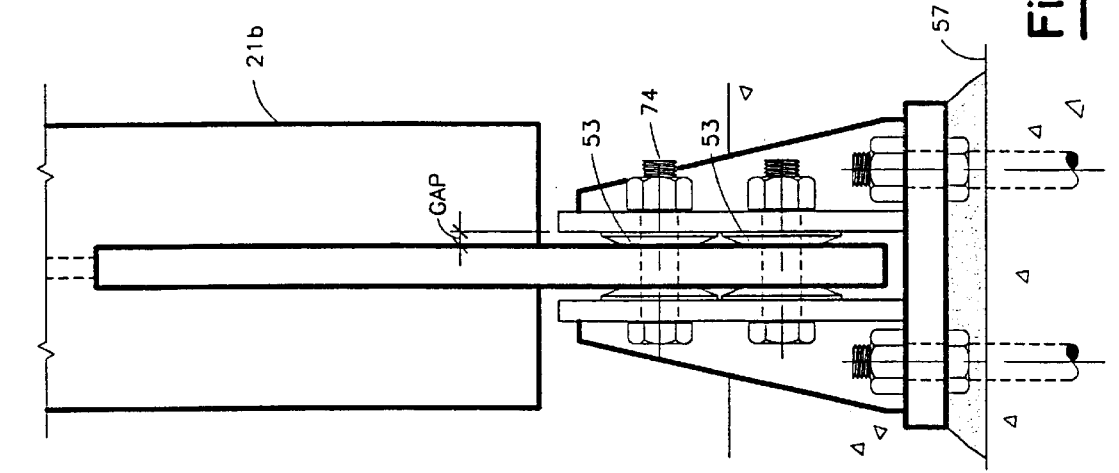
FIG. 11d is an enlarged side elevation view of the connection illustrated in FIG. 11c.
Figure 11C:
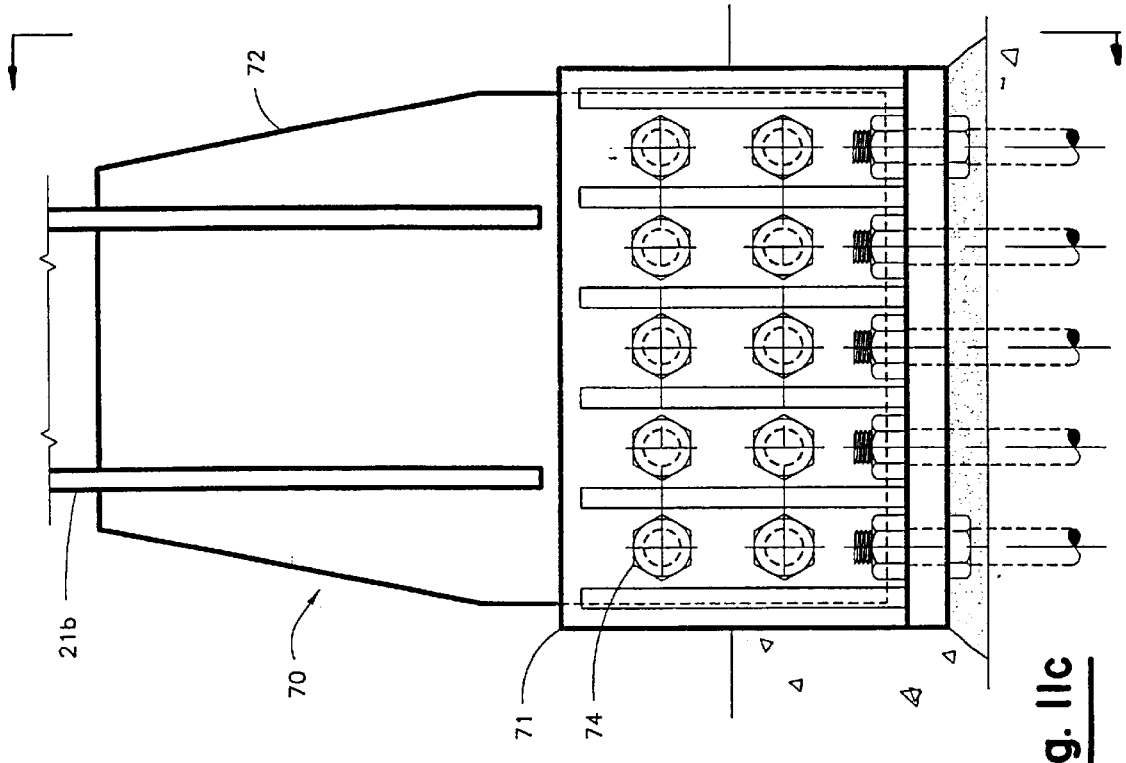
FIG. 11c is an enlarged front elevation view of an alternative connection of a column of the reaction frame illustrating a hinged connection that would minimize internal stresses due to out of plane bending.

FIGS. 11c and 11d illustrate an alternate example of how a column 21b in reaction frame 41 may be connected to the base 57 of the building or the ground. A flexible joint 70 is utilized that includes a base 71 and a body 72. The base and the body are connected by bolts 74. Belleville spring washers 53 are utilized as flexible spacers.

Figure 12A:
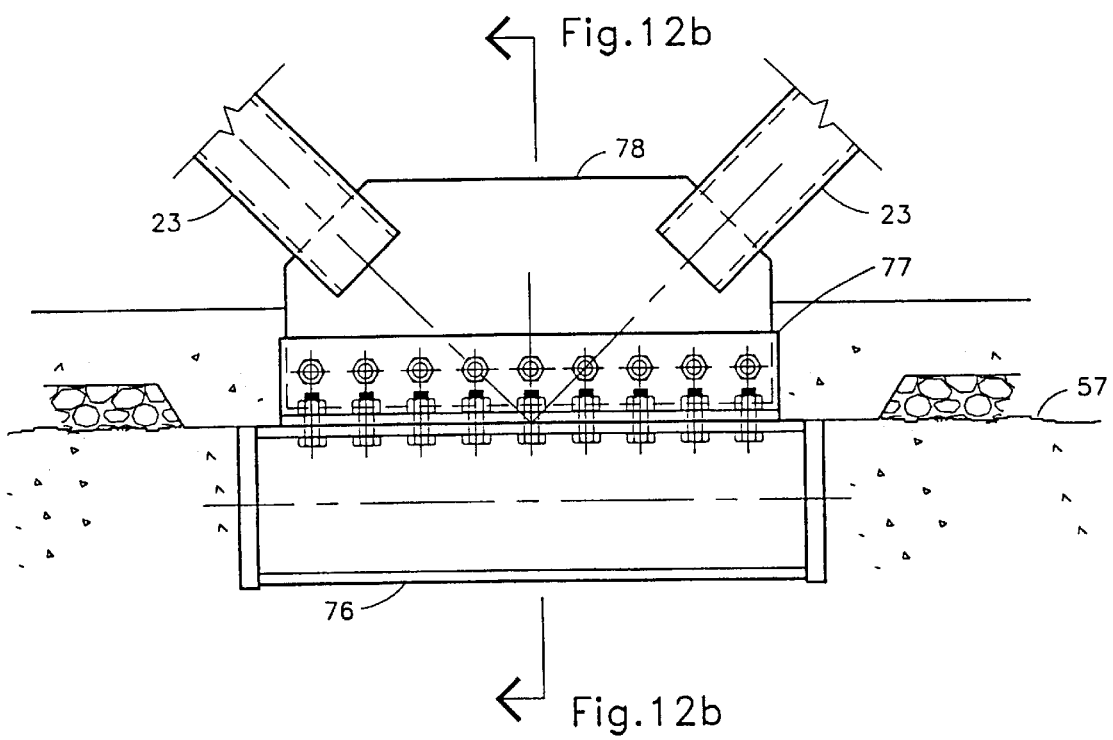
FIG. 12a is an enlarged elevation view of a meeting point of diagonal braces and the base of a reaction frame.
Figure 12B:
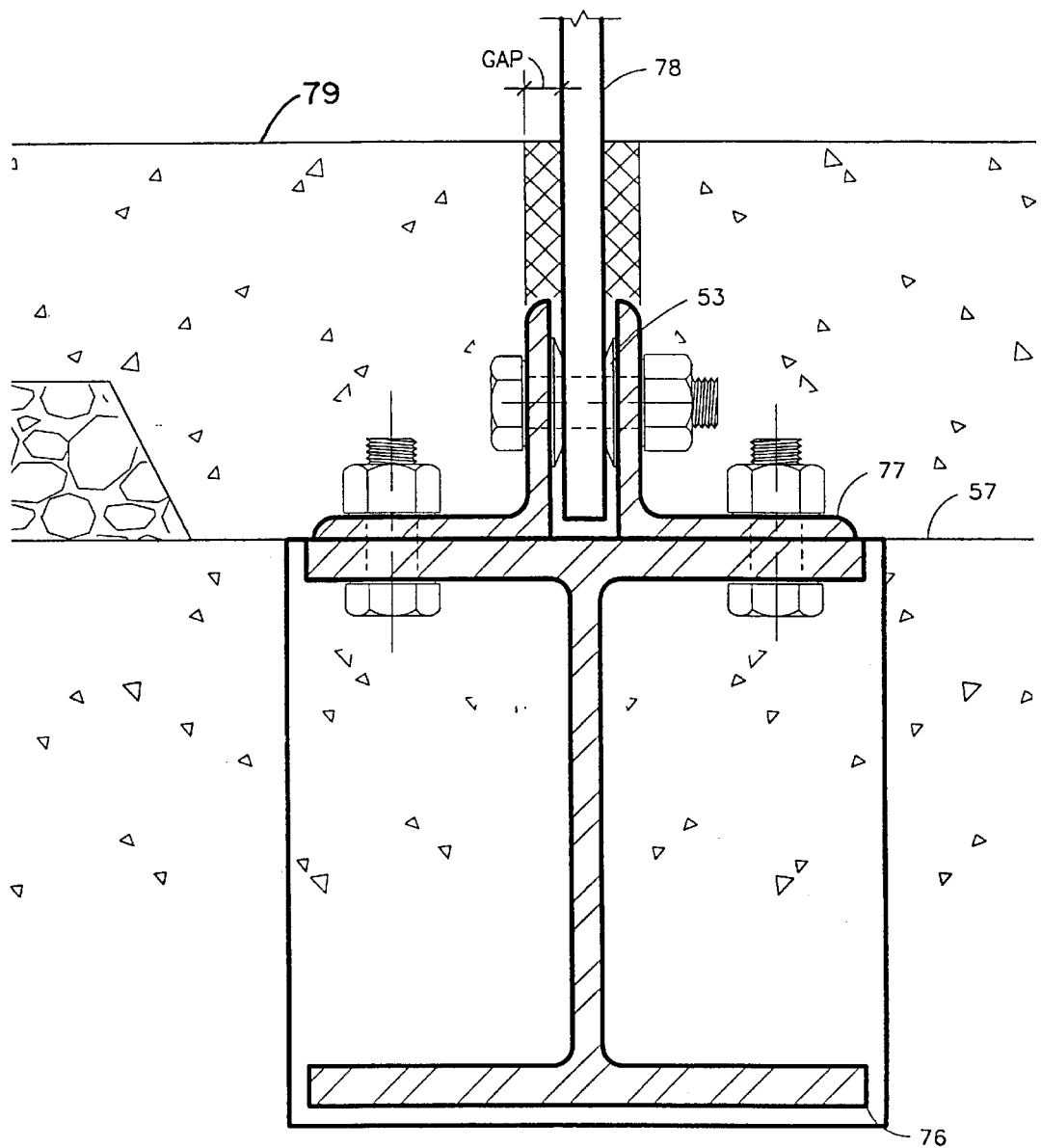

FIGS. 12a and 12b illustrate one way braces 23 within a reaction frame may be connected to the base of the building with a flexible joint that allows the braces to move out of plane without experiencing large external stresses.

A beam 76 is sunk within the ground or the base of the building. Double angles 77 are bolted to beam 76 and to plate 78. Belleville spring washers 53 are provided between double angles 77 and plate 78. A gap is provided between plate 78 and first level floor 79 to allow for flexing.

Figure 13:
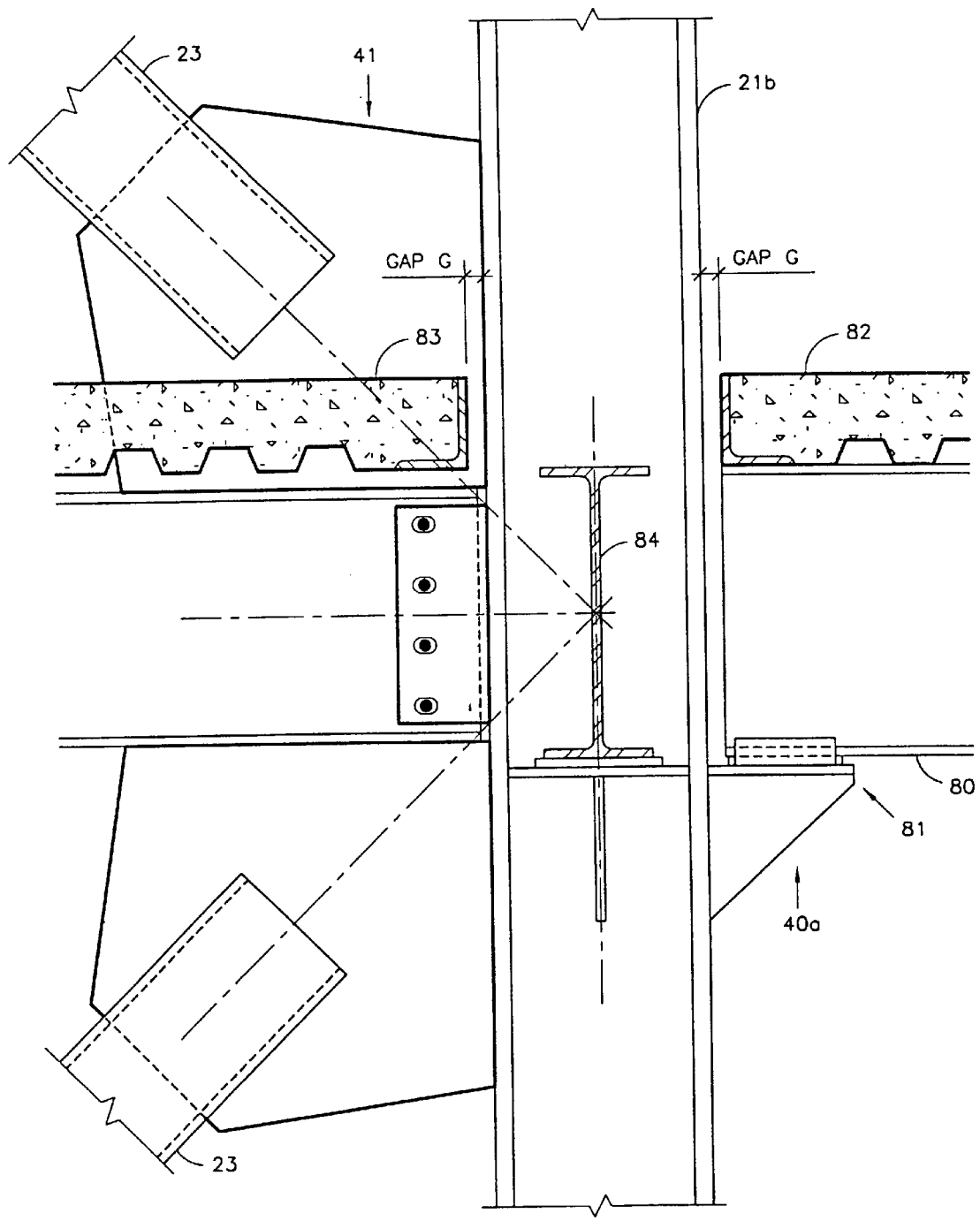
FIG. 13 is an enlarged elevation view of a meeting point between a gravity frame and a reaction frame of a tuned damped structural system in accordance with the present invention.

FIG. 13 illustrates how a reaction frame 41 and an adjacent gravity frame section 40a may be physically interconnected. Gravity frame section 40a "shares" column 21b with reaction frame 41. A floor beam 80 is connected to column 21b via a sliding connection 81. A gap G is provided between floor beam 80 and floor slab 82 and column 21b. Likewise, a gap G is provided between floor slab 83 and column 21b. Preferably, gap G is about two inches but may be larger or smaller, depending on design requirements. A girder 84 is also connected to column 21b with a sliding connection.

Figure 15A:
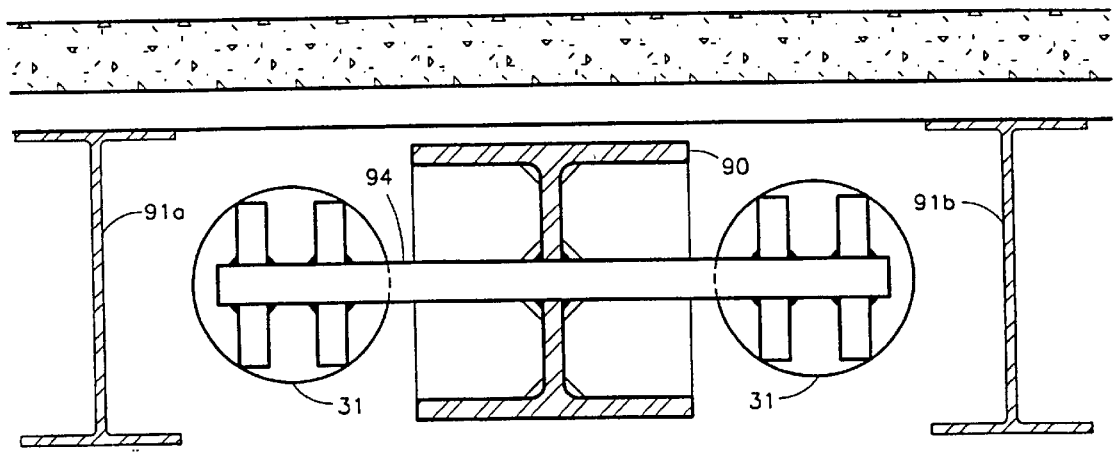
FIG. 15a is a sectional view of the damper connection to the reaction frame as indicated by the line FIG. 15a—FIG. 15a in FIG. 14.
Figure 15B:
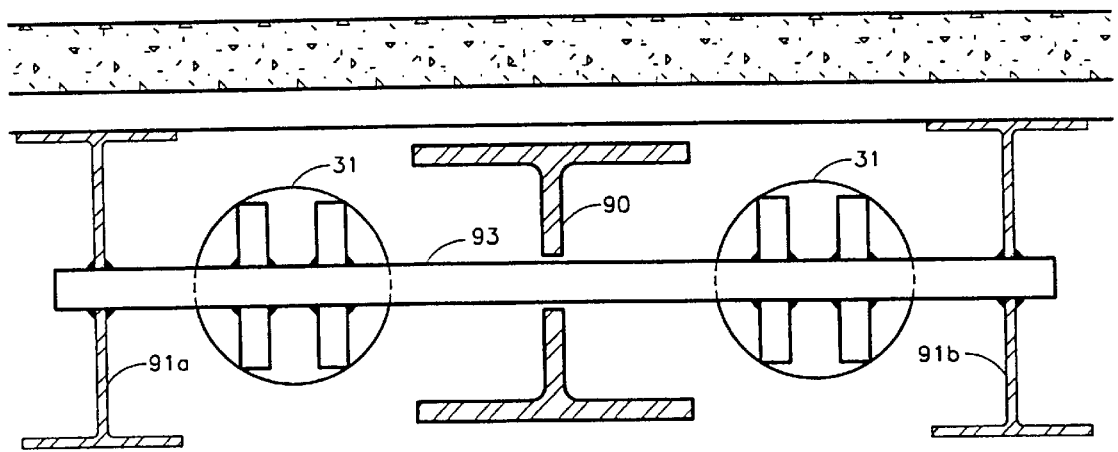
FIG. 15b is a sectional view of the damper connection to the gravity frame as indicated by the line FIG. 15b—FIG. 15b in FIG. 14.
Figure 16A:
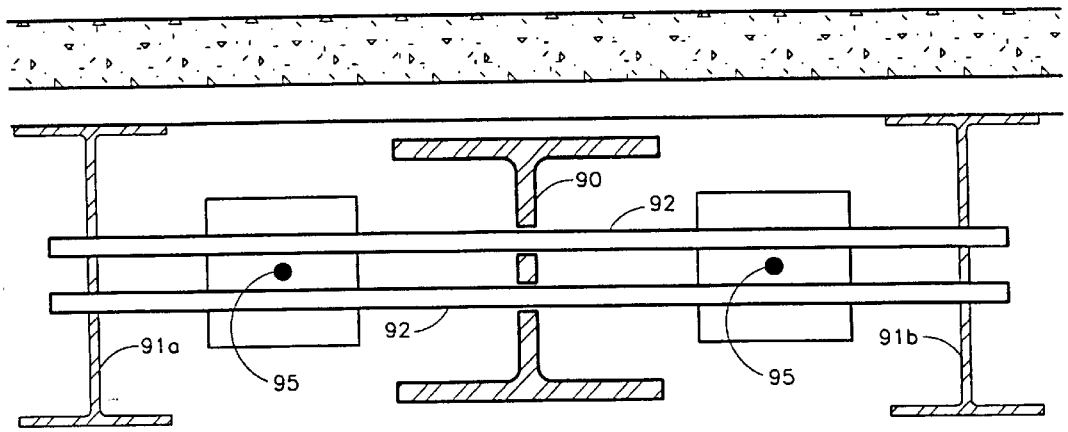
FIG. 16a is a sectional view of the spring connection to the gravity frame as indicated by the line FIG. 16a—FIG. 16a in FIG. 14.
Figure 16B:
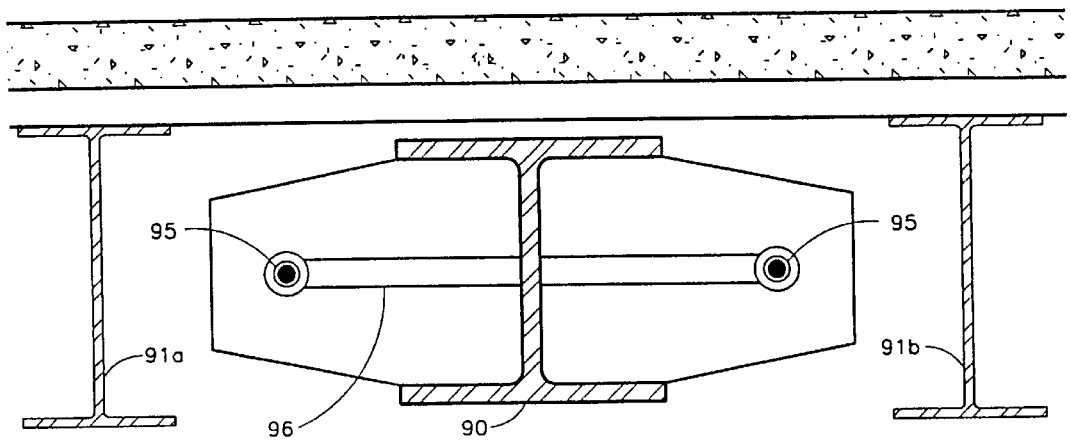
FIG. 16b is a sectional view of the spring connection to the reaction frame as indicated by the line FIG. 16b—FIG. 16b in FIG. 14.

FIGS. 14–16 illustrate an example of an arrangement for connecting springs 30 and EDUs 31 to the gravity frame and the reaction frame. There are obviously numerous such arrangements.

In the example arrangement illustrated in FIGS. 14–16, springs 30 are connected to gravity frame beams 91a and 91b via bracket 92 and rod 95, and are connected to reaction frame beam 90 via bracket 96 and rods 95. Two EDUs 31 are connected to gravity frame beams 91a and 91b via bracket 93 and are connected to reaction frame beam 90 via bracket 94.

Springs 30 used for setting a period of response may be of a variety of materials and configurations and may be arranged to exhibit a variety of variable stiffness characteristics to control the loads developed by a structure and the deformations of the structure. Springs 30 are preferably large heavy duty springs and may be of a variety of forms. Excellent results have been obtained with arrangements of conical steel plates known as Belleville Springs or Disc Springs, which can be obtained from Solon Manufacturing Company, 425 Center Street, Chardon, Ohio 44024-0207, and other manufacturers. Another spring that has provided satisfactory results is MARSH MELLOW manufactured by Firestone, 1700 Firestone Blvd., Noblesville, Ind. 46060. As stated previously, multiple springs may be utilized to provide the required "spring effect." The aggregate effect of the springs may be created by combining various linear and non-linear springs in series and/or in parallel and with gaps to delay a particular spring's engagement. The aggregate effect of the plurality of springs may be described as a single spring with linear or non-linear elastic characteristics.

The energy dissipation units or dampers 31 connected to the frames, or a wall or other reaction structure in a certain arrangement set the damping characteristics of the overall structure. A plurality of energy dissipation devices, such as but not limited to, fluid shock absorbers, energy absorbing plastics, rubbers, etc., friction devices and yielding steel devices may be used. These devices may respond passively due to relative frame displacements or velocities or they may be actively controlled.

Accordingly, during an earthquake, for example, the rigid reaction frame 41 will move with the ground while the gravity frame 40 will sway, and/or move on the optional rollers 60. The springs 30 will control the period of response and the EDUs 31 will dissipate the energy during the response, damping and limiting the movement of the gravity frame. The gaps G will allow movement of the floors relative to the reaction frame. Generally, the design of the reaction frames and gravity frame will be based on local building codes and building specifications, which will require the springs and EDUs to be so configured such that the gaps G will allow movement of two to three inches during an extremely strong earthquake. However, if an unusually strong earthquake were to cause the movement to exceed gaps G, reaction frame 41 will serve as a "back-up" by preventing further movement. The direct engagement of the two frames allows the complete utilization of the strength and energy dissipation capacity of the seismic reaction frame beyond the strength of the plurality of springs and beyond the energy dissipation capacity of the plurality of energy dissipation devices. Accordingly, the present invention reduces swaying and movement of the building during earthquakes when compared to the prior art systems, thereby reducing damage.

Figure 17:
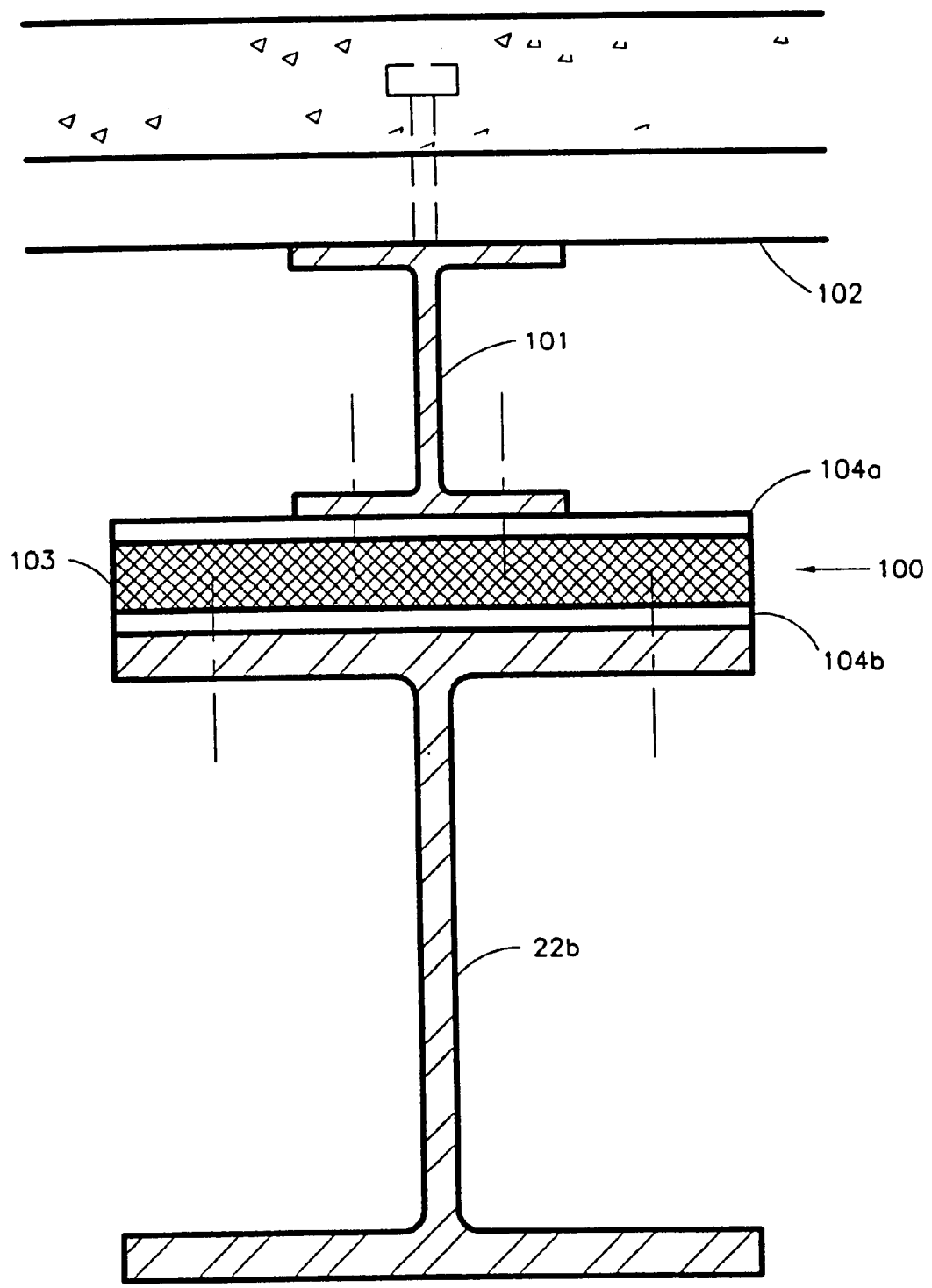
FIG. 17 is an elevation view of an alternative configuration in accordance with the present invention utilizing a Visco-elastic spring/damper combination.

FIG. 17 illustrates an alternative embodiment wherein a Visco-elastic EDU 100 is utilized. The Visco-elastic EDU 100 is placed on a reaction frame beam 22b. A smaller beam 101 is placed over the Visco-elastic EDU and under floor 102. A lens 103 of Visco-elastic material is bonded between steel plates 104a and 104b, and the assembly is placed between the reaction and gravity frames. The Visco-elastic lens of material creates both the spring effect and the damping effect when it is distorted in shear by the relative movement of the frames. The spring effect and the damping effect is controlled by the thickness, the surface area of the lens, and the type of material specified. The material is currently used to make EDUs and it is manufactured by 3M in the Industrial Tape and Specialties Division, 3M Center, Building 220-8E-04, St. Paul, Minn., 55144-1000. Supplemental springs and energy dissipation units can be added to further fine tune the system. The advantage of this configuration of this spring and energy dissipation apparatus is the simplicity of its mechanism.

Figure 18B:
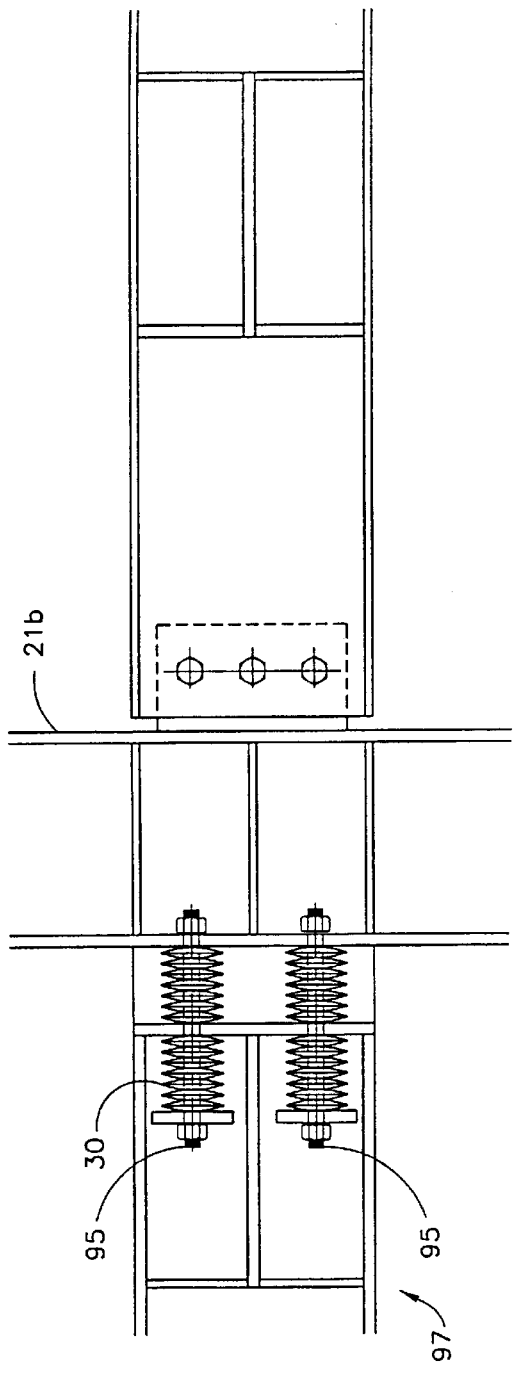
Figure 18C:
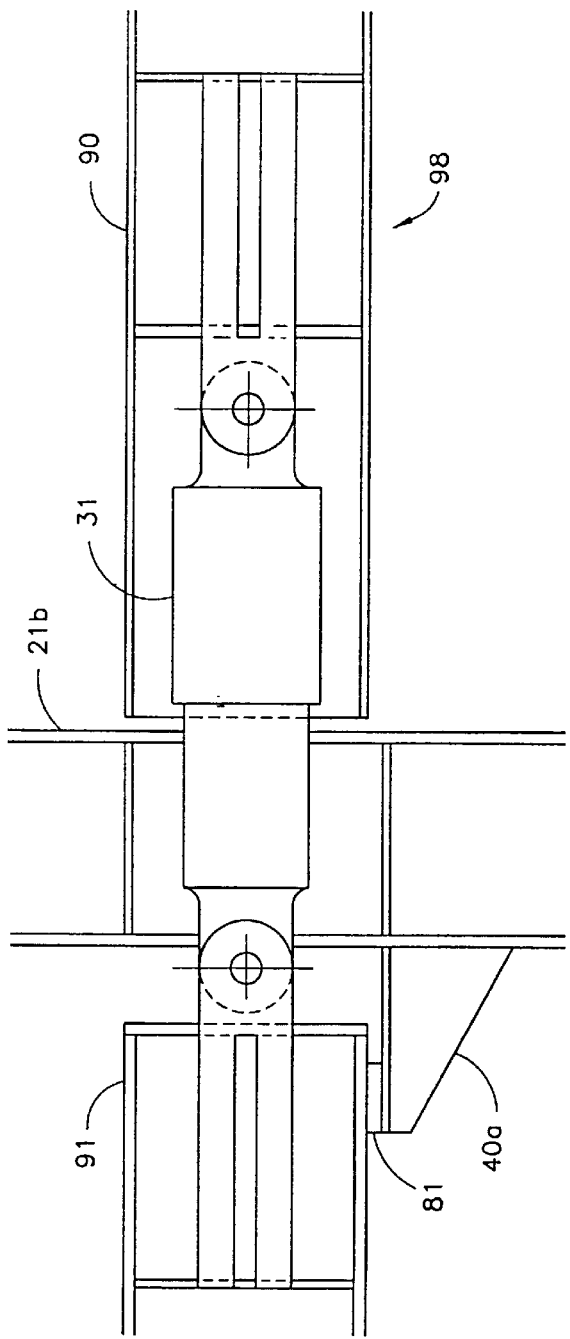

FIGS. 18a, 18b, and 18c illustrate an alternative arrangement of the springs 30 and dampers 31. A bracket 97 connects springs 30 to gravity frame beam 91 and also connects EDUs 31 to gravity frame beam 91. A bracket 98 connects EDUs 31 to reaction frame beam 90. Springs 30 are also connected to reaction frame column 21b.

As mentioned previously, a soft building tends to be susceptible to movement or "swaying" during high winds. In order to account for such a situation, wind fuses 45 may be provided within the tuned, damped structure as illustrated in FIG. 4. These wind fuses make the building more rigid so that swaying is reduced during high winds, but have pins in them that shear during extremely high forces, such as those created by large earthquakes, to thereby make the building less rigid or more "soft" and thereby allowing relative movement between the reaction frame and gravity frame to activate the energy dissipation units.

Figure 19:
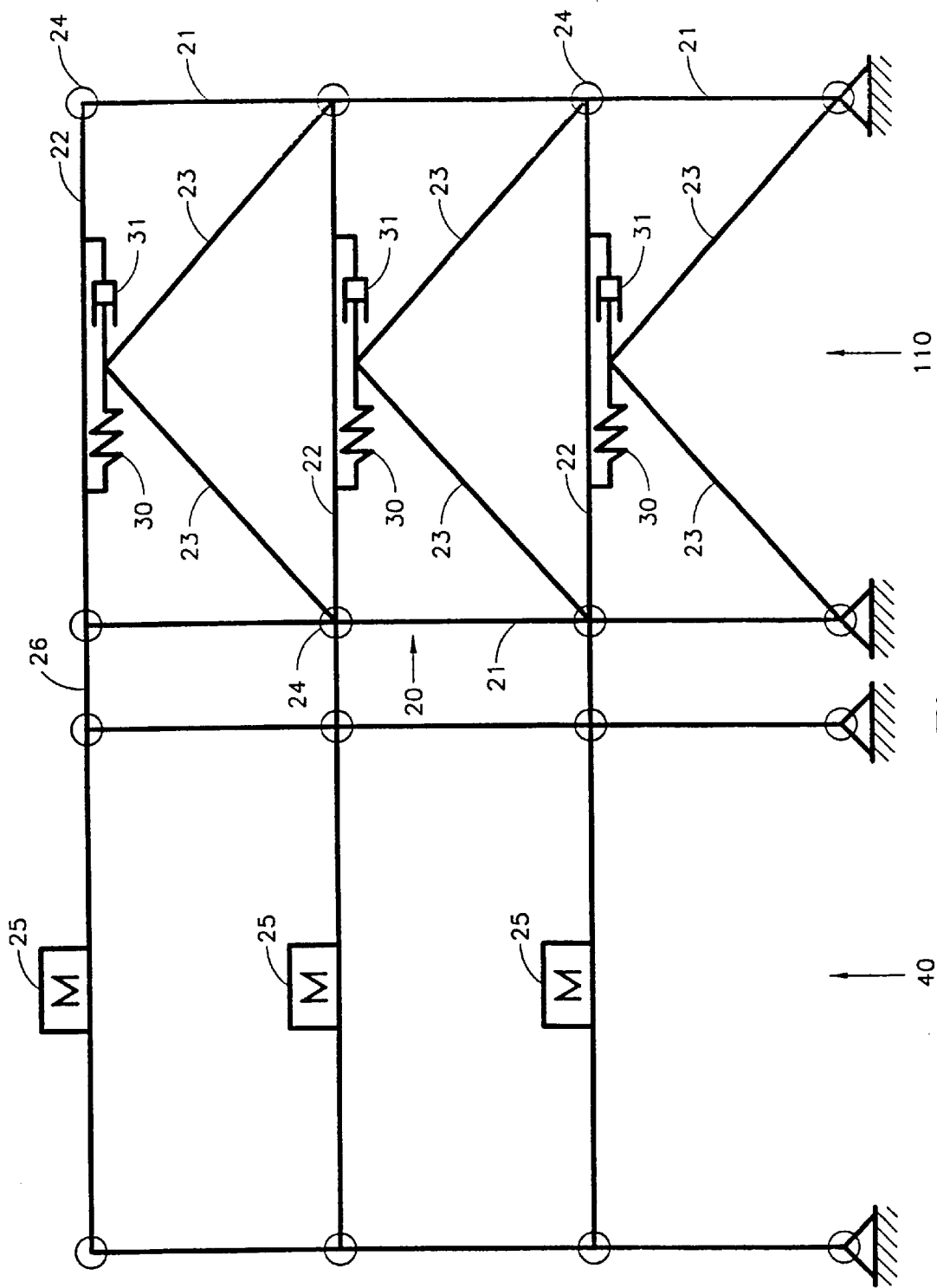
FIG. 19 is a schematic illustration of an alternative embodiment in accordance with the present invention.
Figure 20:
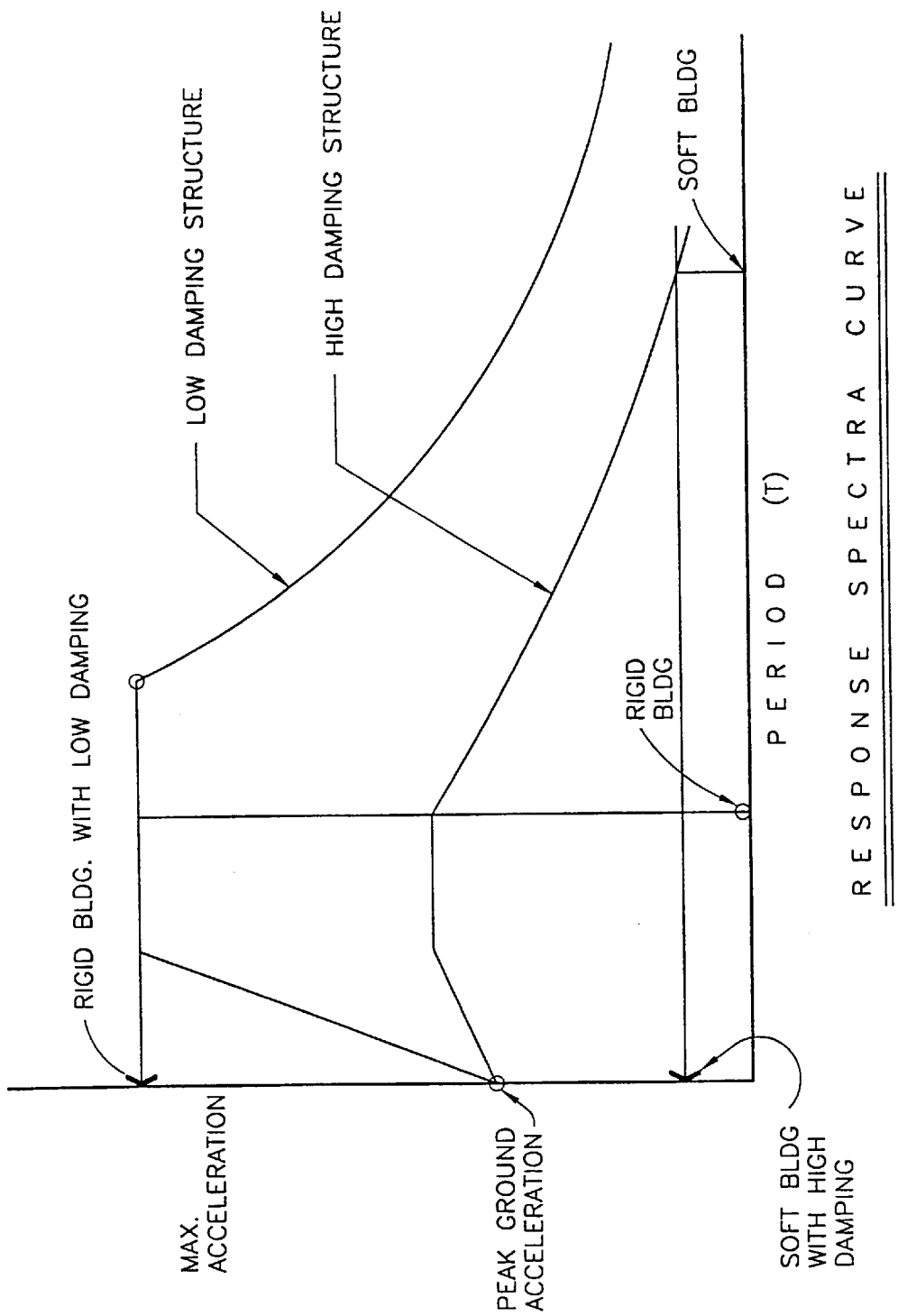
FIG. 20 is a graph illustrating the relationship between period of response, damping and acceleration.

FIG. 19 schematically illustrates an alternative embodiment in which the gravity frame and reaction frame are rigidly linked as schematically represented by 26. Typically, rigid connection 26 is a bolted joint. Such an arrangement is referred to as a tuned damped frame. A tuned damped frame 110 of a multistory building is made up of individual columns 21 and beams 22. First level columns are generally connected to the base of the building rigidly or with a flexible joint, as previously described. Braces 23 are provided in a generally inverted V-shape (but could be arranged in a V-shape or an X-shape). The columns, beams and braces are joined together at various locations with low rotational stiffness or pinned joints 24. Generally, beams 22 correspond to a floor or story of the multistory building. Block 25 on the various beams represents the mass supported at each floor of the multistory building.

A building frame utilizing the tuned, damped frame arrangement illustrated in FIG. 19 would typically have four or more tuned-damped frames for each floor, arranged as shown in FIG. 6. Two of each set of four would be in generally opposing vertical planes, but not necessarily directly opposite each other. Of course, additional or fewer frames could be used depending on the shape and size of the building and the local building code requirements.

With the tuned, damped frame, in order to properly damp the structure, the damper forces are generally greatest at the ground floor and decrease progressively at higher floors. Spring forces are generally additive between the floors and, as with the dampers, the maximum force of the springs is located at the ground floor.

It may therefore be understood that by utilizing the present invention, the control of seismic loads, structural deformations, and structural and non-structural damage may be achieved in originally constructed structures and certain existing structures. A method in accordance with the present invention comprises setting the desired period of response of the gravity load carrying frame through selection of the plurality of springs. The period of response may be chosen with consideration of the local ground shaking characteristics in response to various earthquakes. The desired damping characteristics of the load carrying frame may be set by the selection of the plurality of energy dissipation devices, and the seismic load reaction frame may be designed based on an analysis of the structure as subjected to a given earthquake. The engagement and disengagement of the frame systems via coupling the plurality of springs and plurality of energy dissipation devices may be controlled by the use of force controlled fusible links and displacement limiting gaps. A design process may be undertaken utilizing the present invention to produce structures which are highly effective in resisting the effects of earthquake and wind.

Although the invention has been described with reference to specific exemplary embodiments, it will be appreciated that it is intended to cover all modifications and equivalents within the scope of the appended claims.

What is claimed is:

1. A structure including a system for damping internal forces, and limiting accelerations and drifts caused by external excitations, the system comprising:
   a. a gravity frame coupled to a base level;
   b. at least four separate reaction frames rigidly coupled to a base level in at least one plane; and
   c. connection means for connecting the gravity frame and the reaction frame, the connection means including spring means for setting a period of response and damping means for dissipating energy, and limiting forces, accelerations and drifts within the structure;
   wherein each reaction frame is connected to the gravity frame via the connection means, each reaction frame being contained within a different vertical plane defined by the structure.

2. The structure of claim 1 wherein the gravity frame and the reaction frame extend for one or more stories vertically, the spring means comprises multiple springs and the damping means comprises multiple energy dissipation units, and wherein each story includes at least one said spring and at least one said energy dissipation unit for connecting the reaction frame to the gravity frame.

3. The structure of claim 1 wherein the gravity frame comprises multiple beams and columns, a first level of the columns including a pin connection at a top and a bottom.

4. The structure of claim 1 wherein the reaction frame comprises multiple beams and columns and a first level of columns are connected to the base level via rotationally flexible connections that are rotationally flexible about a horizontal axis parallel to a vertical plane defined by the reaction frame.

5. The structure of claim 1 wherein the gravity frame comprises multiple beams and columns, a first level of columns being connected to base isolation rollers.

6. The structure of claim 5 wherein the base isolation rollers are low friction pads.

7. The structure of claim 1 further comprising wind fuses between the gravity frame and the reaction frame.

8. The structure of claim 1 wherein the structure comprises multiple levels and wherein the gravity frame is coupled to the reaction frame at at least one level.

9. A multi-storied structure including a system for damping internal forces caused by external forces, the system comprising:
   a. a gravity frame, coupled to a base level, comprising multiple beams and columns, the gravity frame extending vertically for multiple stories;
   b. at least four separate reaction frames, rigidly coupled to a base level in at least one plane, comprising multiple beams and columns, each reaction frame extending vertically for multiple stories;
   c. a plurality of springs, each story of each section of the reaction frame being connected to the gravity frame with a least one spring; and
   d. a plurality of energy dissipation units, each story of each reaction frame being connected to the gravity frame with at least one energy dissipation unit.

10. The structure of claim 9 wherein a first level of the columns of the gravity frame include a pin connection at a top and a bottom.

11. The structure of claim 9 wherein a first level of the reaction frame columns are connected to the base level via rotationally flexible connections that are rotationally flexible about a horizontal axis parallel to a vertical plane defined by a corresponding reaction frame.

12. The structure of claim 9 wherein a first level of the columns of the gravity frame are connected to base isolation rollers.

13. The structure of claim 9 further comprising wind fuses between the gravity frame and the reaction frames.

14. A method of damping internal force within a structure caused by external force, the structure including a gravity frame coupled to a base level and at least one separate reaction frame rigidly coupled in at least one plane to the base level, the method comprising:
   connecting springs between the reaction frame of the structure and the gravity frame of the structure; and
   connecting energy dissipation units between the reaction frame of the structure and the gravity frame of the structure.

15. The method of claim 14 further comprising:
   selecting a desired period of response of the structure to external force;
   configuring the springs based upon the desired period of response;
   selecting a desired level of damping within the structure caused by the external force; and
   configuring the energy dissipation units based upon the desired level of damping.

16. A structure having at least one level and including a system for damping internal forces and limiting accelerations and drifts, the system comprising:
   a gravity frame coupled to a base level;
   a separate reaction frame rigidly coupled to the base level; and
   connection means at each level for connecting the gravity frame and the reaction frame such that the gravity frame can distort relative to the reaction frame.

17. A structure in accordance with claim 16 wherein the structure comprises multiple levels.

18. A structure in accordance with claim 16 wherein the connection means comprise spring means for setting a period of response and damping means for dissipating energy and limiting forces, accelerations and drifts within the structure.

19. A structure in accordance with claim 16 wherein the structure comprises multiple levels and wherein the gravity frame is coupled to the reaction frame at at least one level.

20. A building comprising:
   at least one level;
   a frame comprising multiple beams and columns, the beams and columns being arranged to form seismic reaction frame and a separate, essentially flexible, gravity load carrying frame, the reaction frame being coupled to a base level rigidly in at least one plane; and connection means at each level for connecting the reaction frame and the gravity frame such that the gravity frame can distort relative to the reaction frame upon a predetermined amount of force being exerted upon the building.

21. A building in accordance with claim 20 wherein the structure comprises multiple levels.

22. A building in accordance with claim 21 wherein the connection means comprise spring means for setting a period of response and damping means for dissipating energy and limiting forces, accelerations and drifts within the structure.

23. A method of damping internal force within a structure caused by external force, the structure including a gravity frame and at least four separate reaction frames, each contained within a different vertical plane defined by the structure, the method including the steps of:

coupling the gravity frame to a base level for relative movement therebetween;

rigidly coupling the at least four reaction frames in at least one plane to the base level; and coupling the reaction frames and the gravity frame to one another with at least one energy dissipation unit that includes at least one spring element.

24. The method of claim 23, wherein the step of coupling the reaction frame to the gravity frame includes the step of providing a damper element connecting the reaction frame and the gravity frame to one another.

25. The method of claim 24, wherein the connecting step includes connecting the damper in parallel with the spring.

26. The method of claim 25, wherein the step of coupling the gravity frame includes providing base isolation rollers to couple the gravity frame to the base level.

27. In a building structure including a gravity frame located on a base level, a method of damping internal force within a structure caused by external force that includes the steps:

coupling the gravity frame to the base level through an isolating element that permits relative movement between the gravity frame and the base level;

providing the building structure with a reaction frame rigidly connected to the base level; and connecting the gravity frame and the reaction frame to one another with a parallel connection including a spring means and a damper means for relative movement between the gravity frame and the reaction frame.

28. A structure including a system for damping internal forces, and limiting accelerations and drifts caused by external excitations, the system comprising:

a. a gravity frame coupled to a base level;

b. a separate reaction frame rigidly coupled to a base level in at least one plane; and c. connection means for connecting the gravity frame and the reaction frame, the connection means including spring means for setting a period of response and damping means for dissipating energy, and limiting forces, accelerations and drifts within the structure;

wherein the gravity frame comprises multiple beams and columns, a first level of the columns including a pin connection at a top and a bottom.

29. The structure of claim 28 wherein the reaction frame comprises multiple beams and columns and a first level of columns are connected to the ground via rotationally flexible connections that are rotationally flexible about a horizontal axis parallel to a vertical plane defined by the reaction frame.

* * * * *